US012342006B2

(12) United States Patent
Babu et al.

(10) Patent No.: US 12,342,006 B2
(45) Date of Patent: *Jun. 24, 2025

(54) SYSTEMS AND METHODS FOR MINIMIZING NUMBER OF COPIES OF CONTENT ITEMS STORED AT SERVER

(71) Applicant: Adeia Guides Inc., San Jose, CA (US)

(72) Inventors: Veeresh Babu, Karnataka (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,852

(22) Filed: Jan. 17, 2024

(65) Prior Publication Data

US 2024/0187661 A1    Jun. 6, 2024

Related U.S. Application Data

(63) Continuation of application No. 17/539,590, filed on Dec. 1, 2021, now Pat. No. 11,917,215.

(51) Int. Cl.
| | |
|---|---|
| *H04N 21/231* | (2011.01) |
| *H04N 21/239* | (2011.01) |
| *H04N 21/258* | (2011.01) |
| *H04N 21/274* | (2011.01) |

(52) U.S. Cl.
CPC ... *H04N 21/23113* (2013.01); *H04N 21/2393* (2013.01); *H04N 21/25875* (2013.01); *H04N 21/274* (2013.01)

(58) Field of Classification Search
CPC ......... H04N 21/23113; H04N 21/2393; H04N 21/25875; H04N 21/274
See application file for complete search history.

(56) References Cited

U.S. PATENT DOCUMENTS

| | | | |
|---|---|---|---|
| 11,792,457 B1 * | 10/2023 | Nayak | H04N 21/25 725/14 |
| 2002/0055972 A1 | 5/2002 | Weinman | |
| 2009/0077254 A1 | 3/2009 | Darcie et al. | |
| (Continued) | | | |

FOREIGN PATENT DOCUMENTS

EP        3285183 A1    2/2018

OTHER PUBLICATIONS

International Search Report and Written Opinion mailed May 4, 2023 in connection with PCT/US2022/080663.

*Primary Examiner* — Randy A Flynn
(74) *Attorney, Agent, or Firm* — Haley Guiliano LLP

(57) ABSTRACT

Systems and methods are described for receiving a first request, associated with a first user profile, to record a content item, and storing, at a server and based on the first request, a first copy of the content item, accessible via the first user profile. A second request to record the content item may be received, associated with a second user profile, and content consumption history associated with the second user profile may be identified. Based on such content consumption history, a determination may be made to refrain from storing a second copy of the content item based on the second request. In response to receiving a request, associated with the second user profile, to access the content item, the content item may be played at a device associated with the second user profile based on the stored first copy of the content item.

20 Claims, 10 Drawing Sheets

(56) References Cited

U.S. PATENT DOCUMENTS

| | | |
|---|---|---|
| 2012/0131125 A1 | 5/2012 | Seidel et al. |
| 2012/0210382 A1 | 8/2012 | Walker et al. |
| 2012/0224835 A1 | 9/2012 | Smith et al. |
| 2013/0232583 A1 | 9/2013 | Schonfeld et al. |
| 2015/0271450 A1 | 9/2015 | Van Coppenolle et al. |
| 2016/0057483 A1 | 2/2016 | Natarajan et al. |
| 2016/0127789 A1 | 5/2016 | Roberts et al. |
| 2017/0006314 A1 | 1/2017 | Danovitz et al. |
| 2019/0174175 A1 | 6/2019 | Elbert et al. |
| 2021/0185387 A1* | 6/2021 | Kemp ................ H04N 21/4334 |
| 2021/0306688 A1* | 9/2021 | Bress ................... H04N 21/252 |
| 2023/0171442 A1 | 6/2023 | Babu et al. |

* cited by examiner

| Currently 100,000 Requests for Content and 45,000 Copies to be Maintained (228) | Protect Recording Option Usage (210) | Recordings Consumed Multiple Times (212) | Content Consumed While Being Recorded (214) | Typical Times When Recorded Content Consumed (216) | Recording Downloaded for Offline Viewing (218) | Content Being Recorded Locally (220) | Binge Watching Tendencies (222) | Weight of Other Content Scheduled for Recording (224) | Typical Edge Server for Recordings (226) |
|---|---|---|---|---|---|---|---|---|---|
| User Profile A (202) | 20% of Recordings | 10% of Recordings | 5% of Recordings | Right After Recording | 5% of Recordings | No | 1 Episode at a Time | 0.7 | New York City |
| User Profile B (204) | 10% of Recordings | 5% of Recordings | 20% of Recordings | Two Days After Content Recorded | 2% of Recordings | No | 5 Episodes at a Time | 0.4 | New York City |
| ... (206) | ... | ... | ... | ... | ... | ... | ... | ... | ... |
| Pool A (208) | 12% of Recordings | 11% of Recordings | 17% of Recordings | One Day After Content Recorded | 3% of Recordings | 3% of Recordings | 2 Episodes at a time | 0.6 | New York City |

FIG. 2

SYSTEMS AND METHODS FOR MINIMIZING NUMBER OF COPIES OF CONTENT ITEMS STORED AT SERVER

CROSS-REFERENCE TO RELATED APPLICATIONS

This application is a continuation application of U.S. patent application Ser. No. 17/539,590, filed Dec. 1, 2021, the disclosure of which is hereby incorporated by reference herein in its entirety.

BACKGROUND

This disclosure is directed to systems and methods for minimizing a number of copies of content items stored at a server (e.g., a cloud DVR). In particular, techniques are disclosed for determining, based on content consumption history associated with a particular user profile, to refrain from storing a copy of a content item requested to be recorded, and instead to enable such user profile to access a previously stored copy of the content item.

SUMMARY

Modern media distribution systems enable a user to access more media content than ever before, and on more devices than ever before. Cloud DVRs (or nPVRs or nDVRs) enable users to utilize network resources to record broadcast content or OTT content for delivery to various devices, as well as giving them the ability to record multiple shows simultaneously. In one approach, a cloud DVR operator determines that a copy of requested content should be stored each time a request to record the content is received from a user. In some jurisdictions, there may be a requirement (e.g., contractual or legal) imposed on a cloud DVR operator to store a copy of content for each received recording request.

However, while the cloud offers greater storage capacity than a local DVR, cloud storage is not infinite, and storing a copy each time a recording request is received at the cloud DVR may waste computing resources of the cloud DVR operator without providing a commensurate benefit to subscribers. For example, it is unlikely that each user having requested to record content will request to access a copy of the recorded content at the same time, e.g., subscribers often schedule recordings at their own leisure for disparate purposes, may reside in different times zones, and may have different consumption habits. Users may schedule recording for many reasons, e.g., subscribers may desire to skip through the commercials when they watch a recorded movie, subscribers may believe they might be away from their home (or otherwise be unable to watch) during the broadcast of the movie, or subscribers may simply like the movie and want to watch it multiple times (e.g., the subscriber might watch it at the time of broadcast and record it for later viewing as well). In addition, a user often requests to record content that he or she may (e.g., unbeknownst to the user) already have access to on demand (e.g., via a different platform than a platform associated with a cloud DVR), which may lead to a waste of finite storage resources of the cloud DVR provider to store a copy of content the user can otherwise access. At the same time, if a cloud DVR operator does not store enough copies to fulfill various subscriber's requests to watch the content scheduled for recording at any given time, users may become frustrated and decide to switch to a different cloud DVR service.

To overcome these problems, systems and methods are provided herein for intelligently determining a minimum number of copies of content items to be stored at a server. Such systems and methods may comprise receiving a first request to record a content item, wherein the first request is associated with a first user profile, and storing, at a server and based on the first request, a first copy of the content item, wherein the first copy of the content item is accessible via the first user profile. A second request may be received to record the content item, wherein the second request is associated with a second user profile, and content consumption history may be associated with the second user profile. Based on the identified content consumption history, a determination may be made to refrain from storing a second copy of the content item based on the second request, and a request, associated with the second user profile, may be received to access the content item. In response to receiving the request, the content item may be caused to be played at a device associated with the second user profile based on the stored first copy of the content item.

Such features may enable intelligently minimizing (e.g., using heuristic-based techniques or machine learning techniques) the number of recordings (on the cloud) of a specific content item (e.g., a movie, a sports game, an episode or episodes of a TV show, etc.), e.g., by automatically allocating (e.g., on the fly/upon request) a streaming license for an available copy (e.g., part of a shared pool of copies) to a requesting device. In some embodiments, the number of copies that are recorded is not equivalent to the number of requests (the number of subscribers that requested a copy of the content item), but such number rather may be determined based on the profile (e.g., a collective profile associated with the pool) of the subscribers that requested such recording. The profile information of nDVR subscribers may comprise critical viewing or consumption history information that can be leveraged by the nDVR service to determine how many copies of a particular content item should be recorded to strike the appropriate balance between storing enough copies to meet consumer demand while conserving storage space by reducing the number of copies stored. For example, nDVR requests for a specific content item (e.g., the movie "Mortal Kombat") may be grouped to determine or predict the minimum number of copies that should be recorded by the nDVR service in order to fulfill a subscriber's request to watch the content item at any given time. In some embodiments, an initial number of minimum copies to record may be dynamic such that the initial number of minimum copies changes as more requests are received up to the time of broadcast (and possibly into the broadcast as well, such as where the cloud DVR operator permits users to record content that is being broadcasted, e.g., overtime period of an NFL game, last 20 minutes of a show, etc.).

In some embodiments, in response to receiving the request, a license may be associated with the second user profile, wherein the license permits the second user profile to access the stored first copy of the content item, and the license may be withdrawn in response to determining that the playing of the content item has concluded or has been abandoned. Such allocation and de-allocation of streaming licenses for a recorded content item may reduce the number of recorded copies to more efficiently utilize storage of a cloud DVR operator.

In some aspects of this disclosure, the first copy of the content item is one of a plurality of copies of the content item stored in association with a shared pool of copies of the content item, and the first user profile and the second user profile are included in a plurality of user profiles associated with the shared pool. The content consumption history may comprise user interaction data associated with previously recorded content items, and a number of copies of the content item to be stored in association with the shared pool may be determined based on content consumption histories of the plurality of user profiles associated with the shared pool.

In some embodiments, the provided systems and methods may be further configured to determine a popularity of the content item, and determine, based on the content consumption history, a weight of other content items scheduled for recording for each user profile associated with the pool, wherein the weight represents a likelihood of an order that content will be consumed. Each time a new request to record the content item is received in association with a user profile, determining whether to update the number of copies of the content item may be performed based on one or more of the determined weight of other content items scheduled for recording and the popularity of the content item.

In some aspects of this disclosure, associating the first user profile and the second user profile with the shared pool is based on determining that each of the first user profile and the second user profile is frequently provided recorded content via a common edge server. For example, the location of the streaming server (e.g., based on analyzing an IP address or an association with a data center in a specific location, or cellular telephone network identifiers) used during streaming nDVR content may be used as historical data to determine the groupings of subscribers in different locations. For example, subscribers in two different states might be grouped together into one pool (to determine the number of copies that should be recorded for that pool) since these subscribers are normally served content from the same data center/edge server locations when they stream nDVR content. Additionally or alternatively, a number of devices in the various locations that scheduled the content item for recording and are tuned to the channel prior to the start of the actual broadcast can also be used to adjust the number of minimum copies. Additionally or alternatively, other information can be taken into account, e.g., a number of reminders or autotune reminders (e.g., to auto tune to the channel when the content item starts), as well as whether the content is being recorded locally as well, e.g., for subscribers with hybrid plans having a local DVR as well as dedicated or unlimited cloud DVR hours.

In some embodiments, determining, based on the identified content consumption history, to refrain from storing the second copy of the content item based on the second request may be performed in response to determining that available storage of the server is below a threshold. That is, the techniques disclosed herein may be invoked as needed, e.g., when the nDVR storage system reaches a threshold (e.g., configured by an administrator), to avoid reaching maximum storage. For example, in operation, the nDVR service can record multiple copies as requested and then resort to the techniques disclosed herein to manage storage (e.g., storage nodes may be filling up rapidly if subscribers are scheduling lots of recordings, etc.).

In some aspects of this disclosure, a third request to record the content item may be received, wherein the third request is associated with a third user profile, and a determination may be made that the third user profile is associated with a subscription to a content service that provides access to the content item on demand. A determination may be made to refrain from storing a copy of the content item based on the third request, and in response to receiving a request, associated with the third user profile, to access the content item, causing the content item to be played at a device associated with the third user profile via the content service. For example, a subscriber might have scheduled the recording of the movie "Fatman," and the subscriber is subscribed to the Starz Channel. If at the time of the requesting the playing of the recording, the movie is available for free from the Starz Channel, then a license to a recorded copy does not necessarily need to be issued, and the user can be presented with the option to play the movie directly from Starz.

In some embodiments, the provided systems and methods may be further configured to determine that supplemental content is scheduled to interrupt the playing of the content item available on demand from the content service, and to associate a license with the third profile to permit skipping of the supplemental content during the playing of the content item. For example, the supplemental content may be an advertisement, and for content that is available on demand but advertisement-supported/not skippable, a license may be issued so that the subscriber can skip ads. The source of the content (e.g., which service is currently offering it on demand) can be an indicator of whether the content is advertisement-supported or not.

In some aspects of this disclosure, in response to receiving the second request (associated with the second user profile) to record the content item, the provided systems and methods may determine that the content item is associated with a content source to which the second user profile is not subscribed, and provide a selectable option to initiate payment to permit the second user profile access to the content item, wherein the request to access the content item comprises receiving a selection of the selectable option to initiate payment. For example, if the subscriber elects to subscribe to or otherwise purchase the recording, then a dedicated copy may be recorded for such subscriber and a license may be issued for such content.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 2 shows illustrative data structures storing content consumption history, in accordance with some embodiments of this disclosure;

DETAILED DESCRIPTION

As referred to herein, the term "content item" should be understood to refer to an electronically consumable user asset, e.g., television programming, as well as pay-per-view programs, time-shifted content, on-demand programs (as in video-on-demand (VOD) systems), Internet content (e.g., streaming content, downloadable content, webcasts, etc.), augmented reality content, virtual reality content, video clips, audio, playlists, websites, articles, electronic books, blogs, social media, applications, games, and/or any other media or multimedia, and/or combination of the above.

Figure 1:
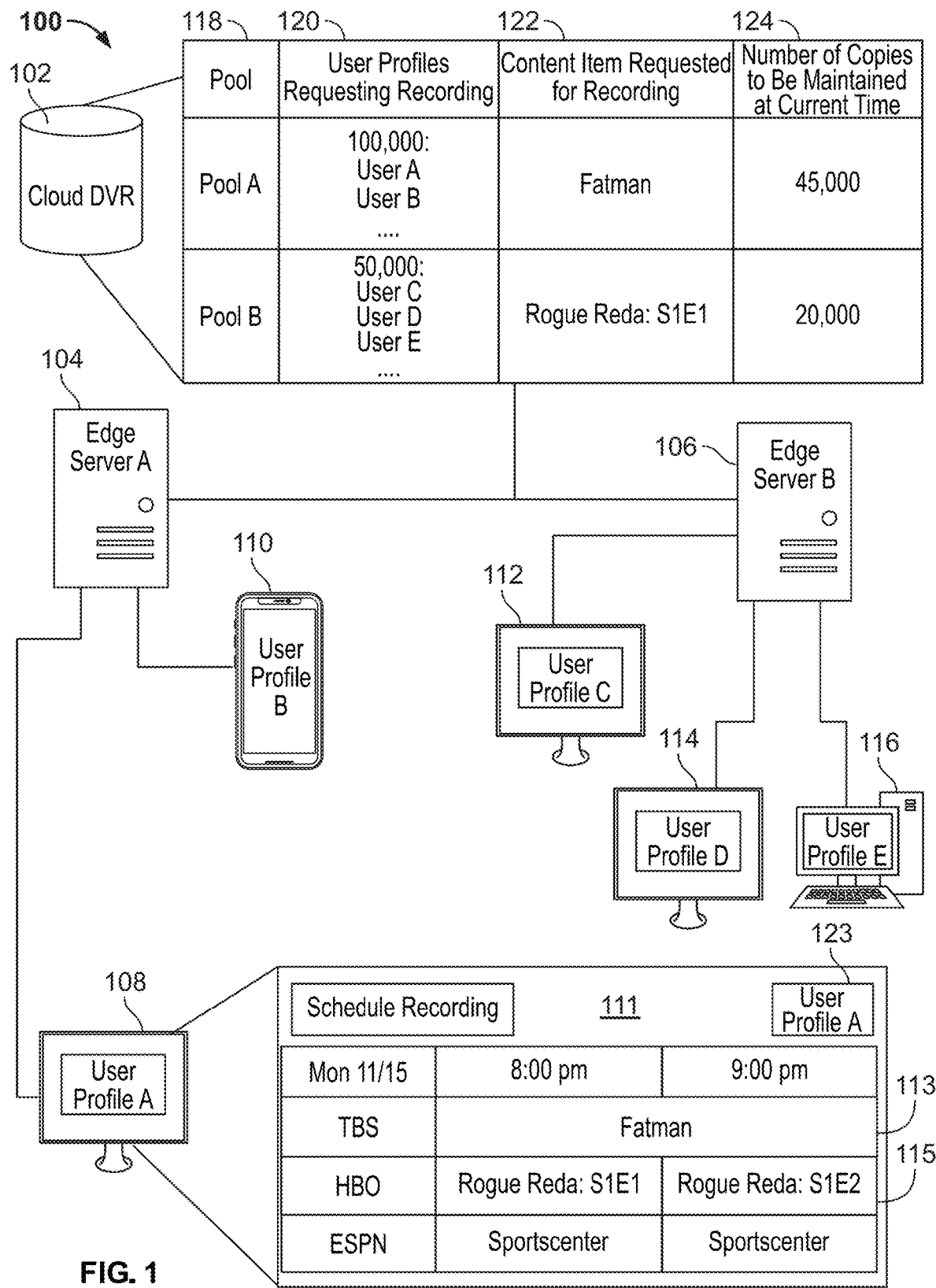
FIG. 1 shows a block diagram of an illustrative system for minimizing a number of copies of content items stored at a server, in accordance with some embodiments of this disclosure.

FIG. 1 shows a block diagram of an illustrative system 100 for minimizing a number of copies of content items stored at a server, in accordance with some embodiments of this disclosure. System 100 includes cloud digital video recorder (DVR) or network DVR 102, which may perform one or more functions of a DVR, e.g., receiving, recording, storing, and sending content items to one or more consumption devices 108, 110, 112, 114, 116 via a network (e.g., communication network 606 of FIG. 6). Cloud DVR 102 may provide access to electronic programming guide (EPG) data and enable users to schedule recordings of content items (e.g., via user interface 111 provided at consumption device 108). Whereas a set-top box (STB) DVR device at a user's home typically may be used locally by one or a relatively small number of users, a networked DVR may support any number of users distributed across any number of different locations via a communication network, and may provide greater storage capacity than an STB in a user's home. For example, a first user (e.g., associated with a first user profile) using a portable device at one location may access cloud DVR 102, request content be recorded by cloud DVR 102, and cloud DVR 102 upon request may stream the content for display on the first user's portable device. In addition, a second user (e.g., associated with a second user profile) using a consumption device at another location may access cloud DVR 102, request content be recorded by cloud DVR 102, and cloud DVR 102 upon request may stream the content for display on the second user's consumption device. In some embodiments, content items can be delivered to devices of users (e.g., connected TVs, streaming boxes, STBs) via any of various suitable delivery techniques, e.g., Internet Protocol television (IPTV), or live OTT (over-the-top) content, where users may join a channel or a multicast address associated with that channel.

Cloud DVR 102 may store any suitable number of recorded content items scheduled for recording by any suitable number of consumption devices, and enable subscribers or users to manage their recordings and request delivery of recorded content items to one or more consumption devices (e.g., smart televisions, mobile devices, personal computers, STBs) associated with a subscriber. In some implementations, a cloud DVR subscriber may not need to own and maintain a device capable of storing the digital content within the home. Cloud DVR 102 may enable a subscriber to record a live program (currently being broadcasted or to be broadcast in the future) so that he or she can consume the recorded program later (or while the recording is occurring). A cloud DVR operator associated with cloud DVR 102 may store recorded content items (as well as metadata associated with the content item) to network storage and provide the recorded content item (and associated metadata) over a network when requested by the user. The cloud DVR service may be provided by a content distributor, a content provider, or another entity. In some embodiments, cloud DVR 102 may be associated with an Internet domain name. For example, a subscriber may access cloud DVR 102 using a web browser or other application running on a consumption device by providing user account credentials. Content items stored by a cloud or network DVR may be associated with uniform resource locators (URLs) that identify a location of the stored data, and association of data stored by a network DVR 102 with URLs may, for example, facilitate sharing of and access to the data across various devices and among various users.

Cloud DVR 102 may be configured to store and to provide access to content items in association with registered user accounts and/or profiles. For example, a cloud DVR subscriber may register or be provided with an account with cloud DVR 102 and may be allocated a certain amount of storage space available for storing recorded content items and other data (e.g., metadata) at cloud DVR 102. Such recorded content items stored in association with the user account or profile may be accessible using any number of consumption devices at which the user provides his or her credentials, and from any number of different locations. Cloud DVR 102 may implement a storage management application which may monitor and store user information and content consumption history associated with each user account or profile. For example, the storage management application may determine and store in a data structure, for each content item (e.g., the movie "Fatman" associated with content listing 113, episodic serial programming "Rogue Reda: S1E1" associated with content listing 115) requested to be recorded (as shown in column 122), a number of user profiles requesting the recording and which user profiles are requesting the recording (as shown in column 120), and may assign the requesting users to particular pools (e.g., Pool A, Pool B, as indicated in column 118) of copies of the content items.

In some jurisdictions and/or circumstances, content items stored in cloud DVR 102 may be subject to legal or contractual rights imposed by the jurisdiction and/or content provider. For example, the operator of cloud DVR 102 may distribute content received from a content provider such as a cable television broadcaster, and the content provider and/or legal system of a particular jurisdiction may impose a requirement that cloud DVR 102 maintain one copy of the content item for each user having requested to record (or having access to) the content item by way of cloud DVR 102. In some embodiments, one or more of the pools (e.g., Pool A, Pool B, as indicated in column 118) determined and maintained by cloud DVR 102 may respectively maintain a number of recorded copies of particular content item that is less than the number of requests to record the content item. For example, such a practice may be permissible in certain jurisdictions, and/or, in certain circumstances, an operator of cloud DVR 102 may reach an agreement with one or more content providers to permit such a practice. In some embodiments, the operator of (or affiliate of) cloud DVR 102 may itself be a content provider, and thus may be free to store as many copies as is deemed suitable for recorded content created by the operator of (or affiliate of) cloud DVR 102, regardless of the jurisdiction or circumstances.

In some embodiments, the storage management application may determine a number of copies of a content item to be recorded and maintained based on one or more profiles (and/or a collective profile) of the subscribers that requested such recording, rather than based on the number of recording requests received. The profile information of the nDVR or cloud DVR subscribers may comprise viewing history information and/or content consumption information that can help cloud DVR 102 determine how many copies of a particular content item should be stored. For example, nDVR requests for a specific content item (e.g., the movie "Fatman" associated with content listing 113) received from subscribers may be grouped by the storage management application to determine the minimum number of copies to be recorded by the nDVR service sufficient to fulfill a subscriber's request to consume the content item at any given time. Such techniques may enable minimizing the number of recordings (on the cloud) of a specific content item (e.g., movies, football game, episode or episodes of a TV show, etc.) by automatically allocating (on-the-fly/upon request) a streaming license for an available copy (e.g., copy part of a pool) to a requesting consumption device. For example, each maintained copy of the content item may be associated with an allocable license, usable by a consumption device to access a copy of a stored recorded content item. In some embodiments, the storage management application may re-allocate a license, previously allocated to a first user profile and used by first user profile to access a copy of recorded content, to a second user profile (e.g., when the first user profile finishes or abandons consuming a copy of recorded content, and the second user profile requests to consume the recorded content, the license may be allocated to and used by the second user profile to access the content). Such re-allocation to a new user profile may help prevent piracy of content. In some embodiments, the re-allocation of a license may be understood as re-allocating the right to access a copy of a recorded content item, e.g., if 500 copies of a particular content item are being maintained, this may correspond to the storage management application being configured to be capable of generating 500 licenses, which may be used simultaneously. In some embodiments, re-allocation of a license may include generating a new license or a new key (e.g., as discussed in connection with FIG. 10) for a recorded copy of a content item, such as, for example, when the license or key is being re-allocated to another user.

Subscribers may schedule recording for any of various reasons, e.g., a subscriber might schedule the recording of a content item because he or she prefers to skip through the commercials when he or she consumes the recorded content; a subscriber might schedule a content for recording because he or might be away from their home or TV during the broadcast of the movie; and/or a subscriber may schedule the recording of a content because he or she may simply desire to consume the content item multiple times, e.g., the subscriber might watch the content item at the time of broadcast as well as recording the content item. As another example, recording requests may not be received from subscribers at the same time, since subscribers schedule recordings at their own leisure and subscribers reside in different times zones. For example, one subscriber might schedule a series recording before the broadcast of Episode 1 of Season 1 of an episodic series, while another subscriber might schedule the recording after consuming two episodes when they were broadcasted (i.e., not from an on-demand source) and deciding he or she enjoys the show. Therefore, the initial number of minimum copies to record may be dynamic and change as more requests are received up to the time of broadcast and possibly into the broadcast as well (since cloud DVR 102 may allow users to record content that is being broadcasted, e.g., overtime period of an NFL game, the last 20 minutes of a show, etc.). Based on analyzing such behavior and user interaction data concerning recording habits associated with respective user profiles over time (as well as any other suitable consumption habits of the user, e.g., as shown in data structure 200 of FIG. 2), the storage management application may predict a reasonable number of copies that will suffice to fulfill a subscriber's request to watch the content at any given time.

Cloud DVR 102 may comprise one or more servers and databases located remotely from consumption devices 108, 110, 112, 114, 116. For example, cloud DVR 102 may be associated with any suitable number of edge servers 104, 106, a content consumption history database, a licensing server, etc. Edge servers 104, 106 may be implemented as part of a content delivery network (CDN) in which cloud DVR 102 may be an origin server (e.g., located at a distribution facility of the cloud DVR operator), and edge servers 104, 106 (e.g., geographically distributed at various strategic locations) may cache content to reduce latency when providing recorded copies of content items to requesting subscribers. Each edge server may comprise one or more servers, and may service any suitable number of consumption devices within a predefined area of the edge server. In some embodiments, one of more of the edge servers may be located closer to respective consumption devices than cloud DVR 102.

In some embodiments, based on the user interaction data concerning recorded content (e.g., how subscribers interact with recordings that they schedule), the storage management application can estimate the number of copies that should be recorded for a segment of the subscriber base (e.g., subscribers in a specific location). In some embodiments, certain locations may be treated separately, and the number of copies of a content item to be maintained may be estimated on a location-by-location basis. In some embodiments, certain locations can be grouped based on their proximity to the edge servers or streaming servers likely to handle a cloud DVR streaming session for subscribers in such locations. For example, subscribers in two different states might be grouped together into one pool (to determine the number of copies that should be recorded for that pool), if such subscribers are normally served content from the same data center/edge server locations when they stream nDVR content.

In the example of FIG. 1, various user profiles (e.g., user profile A indicated at 123, user profile B associated with consumption device 110) associated with one or more respective consumption devices may have requested to record "Fatman" associated with content listing 113, e.g., 100,000 requests to record may be received by cloud DVR 102 from among three million subscribers of the cloud DVR service, and such requests may be received from various states and counties across the United States (or any other jurisdiction or country). The content item indicated at content listing 113 may be scheduled to air on the channel "TBS" at 8:00 PM Eastern Standard Time (EST), as shown at the EPG provided via user interface 111. Subscribers on the West Coast of the United States in the Pacific Standard Time (PST) time zone may prefer to consume "Fatman" as its broadcast begins in their local time zone, sometime after it starts airing, or after "Fatman" has finished airing (e.g., the next day, two days later, etc.). Based on the user interaction data of recorded content (e.g., how these subscribers interact with previously scheduled recordings), the storage management application can estimate the number of copies that should be recorded for a segment of the subscriber base (e.g., subscribers in a specific location). For example, user profiles A and B respectively associated with consumption devices 108, 110 may be grouped in association with edge server 104 when requesting access to a recorded copy of "Fatman," and user profiles C, D and E respectively associated with consumption devices 112, 114, 116 may be grouped in association with edge server 106 when requesting access to a recorded copy of "Rogue Reda: S1E1." Such groupings may be based on a frequency of streaming cloud DVR content at particular edge servers in previous sessions. As shown in column 124 stored at a data structure associated with cloud DVR 102, the storage management application may determine, based on the aforementioned content consumption history and recording habits of users, a suitable number of recorded copies of the content items to maintain. For example, the storage management application may determine a suitable number of copies of "Fatman" to be maintained (e.g., 45,000) is less than the number of recording requests (e.g., 100,000), and the storage management application may determine a suitable number of copies of "Rogue Reda: S1E1" to be maintained (e.g., 20,000) is less than the number of recording requests (e.g., 50,000).

FIG. 2 shows illustrative data structures storing content consumption history, in accordance with some embodiments of this disclosure. In some embodiments, data structure 200 may be stored by cloud DVR 102. Data structure 200 may comprise any suitable data related to prior or current consumption of content by a user profile and/or data related to the content being consumed, content previously consumed, or content to be consumed in the future.

In some embodiments, user information and/or content consumption history information may include, e.g., a list of content providers, content sources, and other services to which the user profile is subscribed, a number of allocable licenses (e.g., a digital entitlement) for respective copies of a recorded content item, an amount of available storage space for storing content items, information about recorded content and scheduled content recordings, content item metadata, social networking account information, a list of consumption devices associated with a user, etc.

For example, data structure 200 may comprise indications 202 and 204 of user profiles registered with the cloud DVR service, as well as a collective profile 208 associated with a shared pool of copies of a content item. In some embodiments, each of the user profile indicated at 202, the user profile indicated at 204 and any suitable number of user profiles that may be indicated at 206 may be included in "Pool A" indicated at 208, and such pool may be associated with the content item "Fatman" (associated with content listing 113 and indicated in column 122 of FIG. 1). Data structure 200 may store data enabling the storage management application to glean insights from the way a subscriber manages his or her recordings. For example, column 210 may correspond to a frequency that a "protect recording" option is invoked in association with each user profile. Such protect recording option may correspond to a media guidance application feature that enables a subscriber, e.g., to whom a specific recording is particularly important, to flag to cloud DVR 102 that such recording should not be deleted even if storage space is needed to record other content (e.g., and thus other unprotected recordings may be deleted instead). As shown in column 210, data structure 200 may store an indication that, based on monitoring user interactions with cloud DVR 102 over time, the user profile indicated at 202 protects 20% of recordings, user profile B protects 10% of recordings, and the collective user profile indicated at 208 for the shared pool protects 12% of content items. Such data may be utilized by the storage management application in determining a minimum number of copies that should be maintained, e.g., for each user that invokes the protect option, a copy or dedicated copy should be stored to ensure access to a copy of the protected content. In some embodiments, data structure 200 may store data indicating that a particular user profile protects certain types of content (e.g., a particular episodic series, or a particular genre) at a higher rate relative to all of the subscriber's recordings, and such information may be taken into account by the storage management application in determining the minimum number of copies to be maintained for the shared pool. In some embodiments, the collective profile indicated at 208 may be computed based on an average or median numerical value computed based on the data of each of the shared pool's users, and re-computed each time a new user is added to a pool.

Data structure 200 may comprise column 212 associated with how frequently particular user profiles consume a program multiple times. For example, the storage management application may determine, based on monitoring a subscriber's viewing habits with respect to recorded content over time, that user profile B only re-watches a recording for 5% of his or her recordings, which may indicate that a copy need not be maintained for such subscriber when that subscriber has already consumed the recorded content. In some embodiments, data structure 200 may store data indicative that a particular user profile consumes certain types of content (e.g., a particular episodic series, or a particular genre) multiple times at a higher rate relative to all of the subscriber's recordings, and such information may be taken into account by the storage management application in determining the minimum number of copies to be maintained for the shared pool. Data structure 200 may comprise column 214 associated with how often particular subscribers and/or user profiles consume content live or while it is being broadcasted. For example, the storage management application may determine, based on monitoring a subscriber's viewing habits with respect to recorded content over time, that user profile B consumes content while it is being recorded for 20% of his or her recordings, and/or that user profile B consumes a sports game while it is being recorded 80% of the time. Thus, the storage management application may determine that when recording a sports game for user profile B, a copy should be maintained for user profile B since it is likely for access to such content item to be requested during the recording.

Data structure 200 may comprise column 216 indicating which times that particular user profiles or the collective user profile indicated at 208 typically consume content after such content is recorded. For example, if the user profile indicated at 204 typically waits two days to consume a recording, a copy may not need to be stored for such user until the two days elapse, whereas if the user profile indicated at 204 typically consumes recorded content immediately after or shortly after the recording, it may be preferable to maintain a copy for such user immediately after the recording. Data structure 200 may store information indicative of an amount of time after content is recorded for each type of content item (e.g., sports recordings may typically be consumed immediately after or while recording, whereas certain movies may typically be viewed a few days after the recording). In some embodiments, data structure 200 may store information indicating historical user interactions with recordings at particular times of the week (e.g., weekends vs. weekdays) and times of the day (e.g., morning vs. evening). For example, the storage management application may determine that fewer copies may be stored during a weekday at noon than on a weekday evening, since many subscribers may be at school or at work at noon on a weekday and unlikely to consume recorded content as opposed to in the evening.

Data structure 200 may comprise column 218 indicating a frequency that particular subscribers download recorded content, e.g., for offline viewing. In some embodiments, downloading the recording for offline viewing may require a dedicated license, and such licenses may be re-allocated (e.g., for at least a predetermined period of time) to a different requesting device after the user has consumed the downloaded recording, and may be allocated back to the device that downloaded the content upon request. In some embodiments, the storage management application may be running at least in part on a license issuing server, which can be configured to manage the pool of available licenses for any recorded item, e.g., by issuing and reclaiming licenses upon receiving streaming or download requests. In some embodiments, the storage management application may determine that certain content (e.g., a popular series or a popular movie) is likely to be downloaded for offline use during travel (e.g., an airline flight, which may be determined based on the user's email, calendar or social media activity), and the storage management application may maintain anticipatory copies in such circumstances for these subscribers.

Data structure 200 may comprise column 220 indicating whether content (e.g., "Fatman"), requested to be recorded, or currently being recorded, at cloud DVR 102 is also scheduled to be recorded locally or is being recorded locally, e.g., for subscribers with hybrid plans, having a local DVR as well as dedicated or unlimited cloud DVR hours allocated to his or her user profile or account. For example, the storage management application may determine that, if a particular recording is being recorded locally in association with a consumption device of a user profile, and historically such user profile typically only utilizes that device to access cloud DVR recordings, a copy may not need to be maintained at cloud DVR 102 for such subscriber.

Data structure 200 may comprise column 222 indicating binge watching tendencies of subscribers with respect to a recorded content item. The storage management application may determine whether subscribers record multiple episodes of serial programming and/or consume multiple episodes of a series in one sitting. The storage management application may leverage the fact the subscribers tend to consume or binge watch one or more seasons, or portions thereof, of serial programming at different rates and in different ways. For example, while some subscribers may consume recorded content on the same day it broadcast, others may prefer to binge five episodes at a time. Thus, the type of content (e.g., movies vs. TV series) may be a useful metric in determining which content items do not require the number of copies to be equivalent to the number of requests. For example, if user profile A has recorded each episode of Season 1 of the content item "Rogue Reda" and is currently consuming a recorded copy of Season 1, Episode 1, it may not be necessary to maintain a copy of Season 1, Episode 8 for such user, until the viewing history of the user indicates that he or she has consumed the first seven episodes. On the other hand, if user profile B is currently consuming a recorded copy of Season 1, Episode 7 of "Rogue Reda" and tends to consume multiple episodes in one sitting, the storage management application may determine that copies of one or more subsequent episodes of "Rogue Reda" should be stored based on such subscriber's tendencies and content consumption history. In some embodiments, a shared pool may be generated for one or more series of serial programming, to leverage such user behavior.

Data structure 200 may comprise column 224 associated with weights assigned to other content that user profiles have requested cloud DVR to record. For example, other content these subscribers have scheduled for recording, and recordings already available for consumption if they wish to play it, may be assigned a weight that represents a likelihood of an order of consumption (e.g., the chronological order in which the user is likely to consume the recorded content). Such weights may be assigned based on historical viewing patterns with respect to recordings of various subscribers, e.g., data indicative of recorded content previously consumed by the user, which may be added to the user's viewing history data during viewing, or after the user consumes the content. For example, if recorded content associated with the user profile comprises content that the user frequently consumes, e.g., within a threshold period of time after recording, a relatively high weight may be assigned to such content, indicating that a copy of such content item should be maintained for the user, whereas another content item that a user typically consumes a week after recording may be assigned a relatively lower weight, and there may be less of a need to maintain a copy of such content item for such user.

Data structure 200 may comprise column 226 indicating a location of an edge server that typically provides requested content to the user profiles indicated at 202 and 204. For example, the storage management application may determine, based on monitoring historical network traffic data associated with cloud DVR 102 and the user profiles, that consumption devices associated with the user profiles indicated at 202 and 204 are typically served content from the same edge server in a particular location (e.g., New York City). In some embodiments, the location of the streaming server (e.g., based on an IP address or association with a data center in a specific location) used during streaming nDVR content may be used as historical data to determine the groupings of subscribers in different locations (e.g., to group user profiles A and B, and any suitable number of other user profiles, into shared pool A indicated at 208, associated with the content item "Fatman" shown in FIG. 1. In some embodiments, the nDVR service or a dedicated microservice within the nDVR system may validate the subscriber's entitlement when a recording request is received, e.g., whether the subscriber's account is entitled to record content from this channel or content source. In some embodiments, the storage management application may issue a look-up command for a cache server from a table of cache servers.

In some embodiments, other information, e.g., a number of consumption devices or set-top boxes having requested a reminder or an auto-tune reminder (e.g., to auto-tune to the channel when the content item scheduled for recording starts) may be analyzed. For example, users having set such reminders may be more likely to consume recorded content while its broadcast, indicating a copy of the content should be set aside for the user. In some embodiments, the popularity of content can impact the number of copies that the storage management application instructs cloud DVR 102 to record and maintain. For example, the storage management application can apply different rules to popular or trending TV series than to a regular movie recording, and can assign popularity scores to certain content (e.g., based on a number of subscribers consuming, recording or otherwise showing interest in content, based on analyzing social media or other website activity, etc.). The nDVR service's algorithm may be driven by subscriber habits, as well as other data that is specific to the content, e.g., popularity.

In some embodiments, operation of the storage management application may be refined over time, e.g., the storage management application may be generous at first when recording a new show (e.g., by recording a number of copies of the first and second episode matching the number of requests, or otherwise providing a cushion of copies over the determined number of minimum copies) but begin adjusting the maximum number of copies to be recorded and maintained as the storage management application collects viewing information and patterns for that specific show. In some embodiments, the storage management application may compute a percentage error over time with respect to content overall and/or specific types of content, and use such percentage error in recording copies of any particular item.

Any suitable combination of the data stored in association with data structure 200 (and/or any other suitable content consumption data or user interaction data) may be employed by the storage management application in determining a minimum number of copies (e.g., indicated at 228) to be maintained for a particular recorded, or scheduled to be recorded, content item, for the shared pool indicated at 208. In some embodiments, such information can be determined from historical data and subscriber profiles and refined dynamically over time as users interact with their recorded content and their TV service. In some embodiments, if the storage management application determines that a consumption device of a subscriber is requesting the playing of a recorded content item that he or she scheduled for recording (e.g., few hours after the airtime), the licensing server may issue a license to one copy in the pool of copies allocated to the subscriber's segment or pool (e.g., based on the subscriber's streaming location). The license may be withdrawn after the user finishes watching the content (e.g., consumes a portion of content exceeding a predefined threshold, or receives user input indicating that he or she is done consuming the content) or if the user abandons the viewing session, e.g., tunes to a different channel, requests to watch a different recording, launches a different app on their device (e.g., STB), accepts a phone call (e.g., when viewing the recorded content on their mobile device and/or via a mobile app), etc. In some embodiments, such on-demand allocation and deallocation of streaming licenses for any recorded content item may be beneficial in reducing the number of recorded copies and thus is storage-efficient.

In some embodiments, the above-described techniques may be invoked as needed, e.g., upon the storage management application determining cloud DVR 102 has reached a threshold (e.g., configured by an administrator). Such techniques may be used to avoid reaching maximum storage. For example, in operation, the storage management application can record a copy each time a recording request is received, and then resort to the previously described embodiments for storage management purposes (e.g., storage nodes may be filling up rapidly if subscribers are scheduling lots of recordings, etc.). In some embodiments, no two users may simultaneously access the same recorded copy of the content item. In some embodiments, any indication of the minimum number of copies being maintained may be transparent to the user.

In some embodiments, one or more machine learning models may be employed in determining a minimum number of copies of a content item requested to be recorded to maintain. For example, a machine learning model (e.g., a neural network) may be trained using historical data comprising a number of requests to record a particular content item and a maximum number of users having requested to access such content item at a given time. The machine learning model may be trained to learn from the training data certain patterns and characteristics indicative of a suitable number of minimum number of copies to be maintained. For example, the machine learning model may learn over time that at certain times of the day, a certain number of copies of a content item of a certain type (e.g., genre or popularity) should be maintained to suffice to fulfill a subscriber's request to watch the content at any given time. The machine learning model may be trained to accept as input one or more content consumption histories or user interaction data characteristics (e.g., user-specific characteristics) and/or content-specific characteristics (e.g., popularity) and other characteristics (e.g., current time of day and day of the week) and output a predicted number of minimum copies for the content item. In some embodiments, such input data characteristics may be encoded as a vector, and/or pre-processed to facilitate input to the machine learning model.

Figure 3:
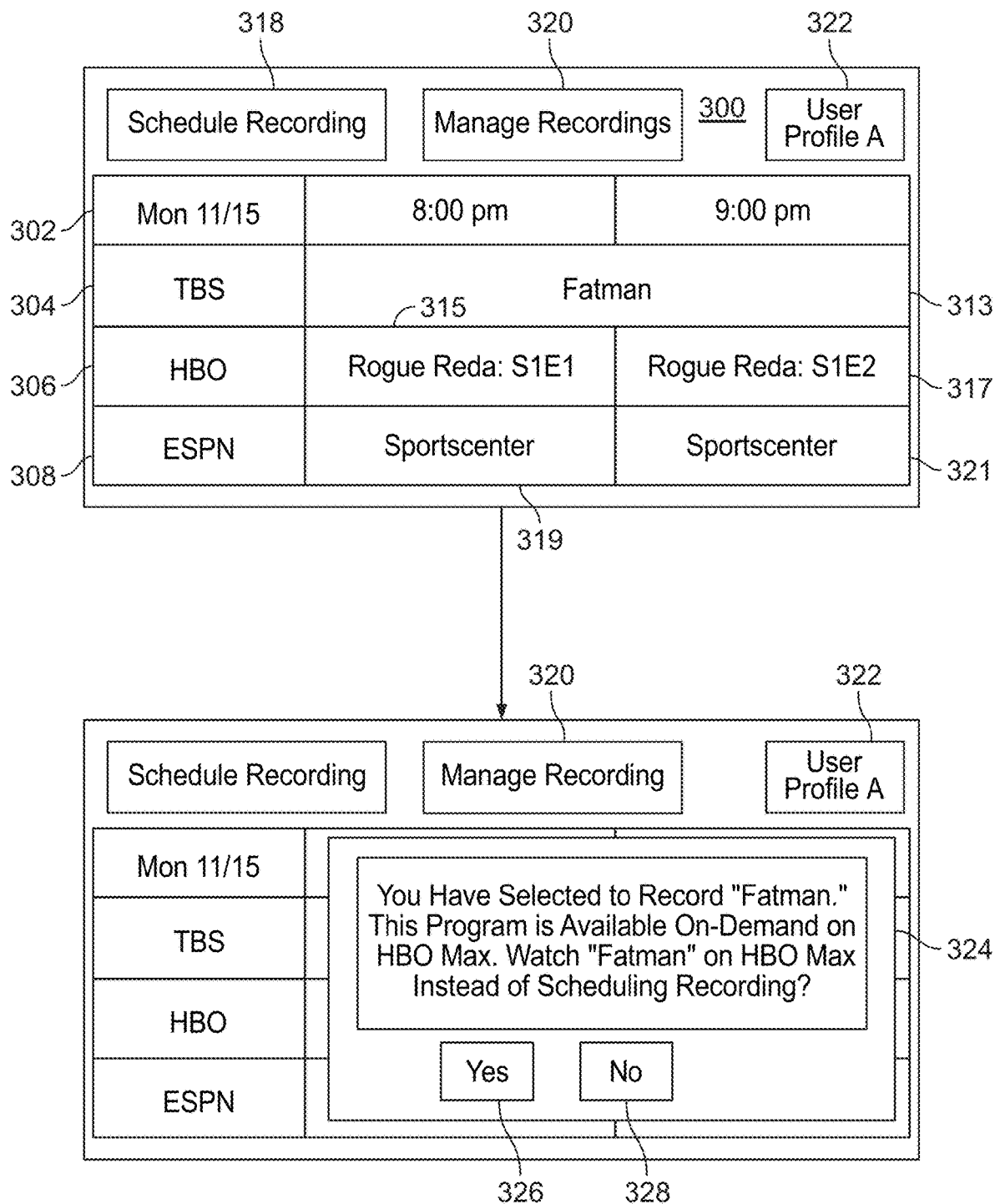
FIG. 3 shows illustrative user interfaces, in accordance with some embodiments of this disclosure.

FIG. 3 shows illustrative user interfaces, in accordance with some embodiments of this disclosure. User interface 300 may be provided by an operator of cloud DVR 102 over a communication network to a consumption device, e.g., via the storage management application or another application, and/or generated locally by the consumption device. In some embodiments, user interface 300 may be a grid guide comprising an indication of a current date 302, a plurality of content item listings associated with and/or transmitted by each of the plurality of content sources (e.g., TBS, HBO, ESPN) during a time interval (e.g., 8 PM-10 PM) that may include the present time (e.g., 8:15 PM). For example, upon receiving selection of an option to view a set of listings for the current time (e.g., by selecting a GUIDE option, by selecting a Live TV option, etc.), user interface 300 comprising listings for any suitable number of channels or content sources may be provided. In some embodiments, the user can navigate the grid guide using a cursor, and when the user positions the cursor on a given content item listing, the media guidance application provides the user with several options, e.g., option 318 to schedule a recording of the content item. In some embodiments, in response to receiving a user selection of a SELECT option, the selected content may be presented in full screen or in a partial screen. For example, in response to the user selecting the option to start recording, the media guidance application may store continuously on a local storage device and/or on a cloud storage device the requested content.

Content source 304 may provide, during the presented time interval, the content item "Fatman" associated with content listing 313, content source 306 may provide the content items "Rogue Reda: S1E1" associated with content listing 315 and "Rogue Reda: S1E2" associated with content listing 317, and content source 308 may provide the content items "Sportscenter" associated with content listings 319 and 321. The user may request that the media guidance application schedule for recording a television show being broadcasted (or otherwise streamed or made available) by a given content source at a particular time. When the particular time is reached, the media guidance application may automatically begin storing the television show received by the content source by accessing the channel associated with the content source. In some embodiments, option 320 may be selectable to view a directory of recorded content for a given user profile stored at cloud DVR 102, and may enable the user to manage his or her recordings, e.g., specify certain settings related to recordings, delete recordings, download recordings, etc. In some embodiments, user interface 300 may permit a user to navigate to future time periods, and/or search for content items, to schedule for recording.

Upon receiving user selection to record a content item, e.g., associated with content listing 313 ("Fatman") from a subscriber associated with the user profile indicated at 323, the storage management application may determine whether the subscriber also subscribes to other content services (e.g., Netflix, Hulu, HBO Max, Disney+, etc.), and whether such other content services also provide access to "Fatman." For example, if the storage management application determines that "Fatman" is available on demand from a content provider that the subscriber associated with the user profile is subscribed to (e.g., HBO Max), the storage management application may cause notification 324 to be generated for display indicating to the subscriber (associated with the user profile indicated at 323) that content item (e.g., "Fatman" associated with content listing 313) requested to be recorded is available to the user on demand via the other content provider. For example, the storage management application may access information indicating other content services and/or channel subscriptions that the subscriber also subscribes to, e.g., by querying another system (e.g., an Accounting module) via a dedicated API. In some embodiments, the storage management application may monitor content that is available from other various services via a universal search feature for which content is constantly updated.

Upon receiving affirmative selection 326 associated with notification 324, the storage management application may determine that a recorded copy does not necessarily need to be maintained, and a license may not need to be issued, for the user profile indicated at 323. For example, if the user profile indicated at 323 is associated with a shared pool of copies of the content item associated with content listing 313, the storage management application may determine that one less copy of the content item should be maintained, and such determination may be made for multiple users, thereby conserving storage resources at cloud DVR 102 by reducing the minimum number of copies to be maintained. Selection of option 326 may cause the content item associated with content listing 313 (associated with the content item "Fatman") to be played via the other content service, e.g., HBO Max. In some embodiments, such playing of the content item via HBO Max may occur within user interface 300 associated with the storage management application, e.g., via an API.

In some embodiments, the storage management may determine whether supplemental content (e.g., advertisements) are to be presented during presentation of the content item in association with the other content provider. For example, subscribers may request to record content because they may prefer to skip through commercials or advertisements, and thus it may be undesirable to redirect subscribers to another service at which the subscriber would be forced to consume commercials or advertisements that interrupt the viewing experience of the content item. Thus, if the storage management application determines that the presentation of the content item via the other content provider includes advertisements or commercials that are not skippable (e.g., based on querying the other content provider), the storage management application may issue a license to the user profile associated with the subscriber, to enable such commercials or advertisements to be skipped during presentation of the content item. In some embodiments, the source of the content (e.g., which service is currently offering it on-demand) can be an indicator of whether the content contains supplemental content, e.g., is ad-supported or not. In some embodiments, the storage management application may provide a deep link to such other content provider (e.g., HBO Max).

Figure 4:
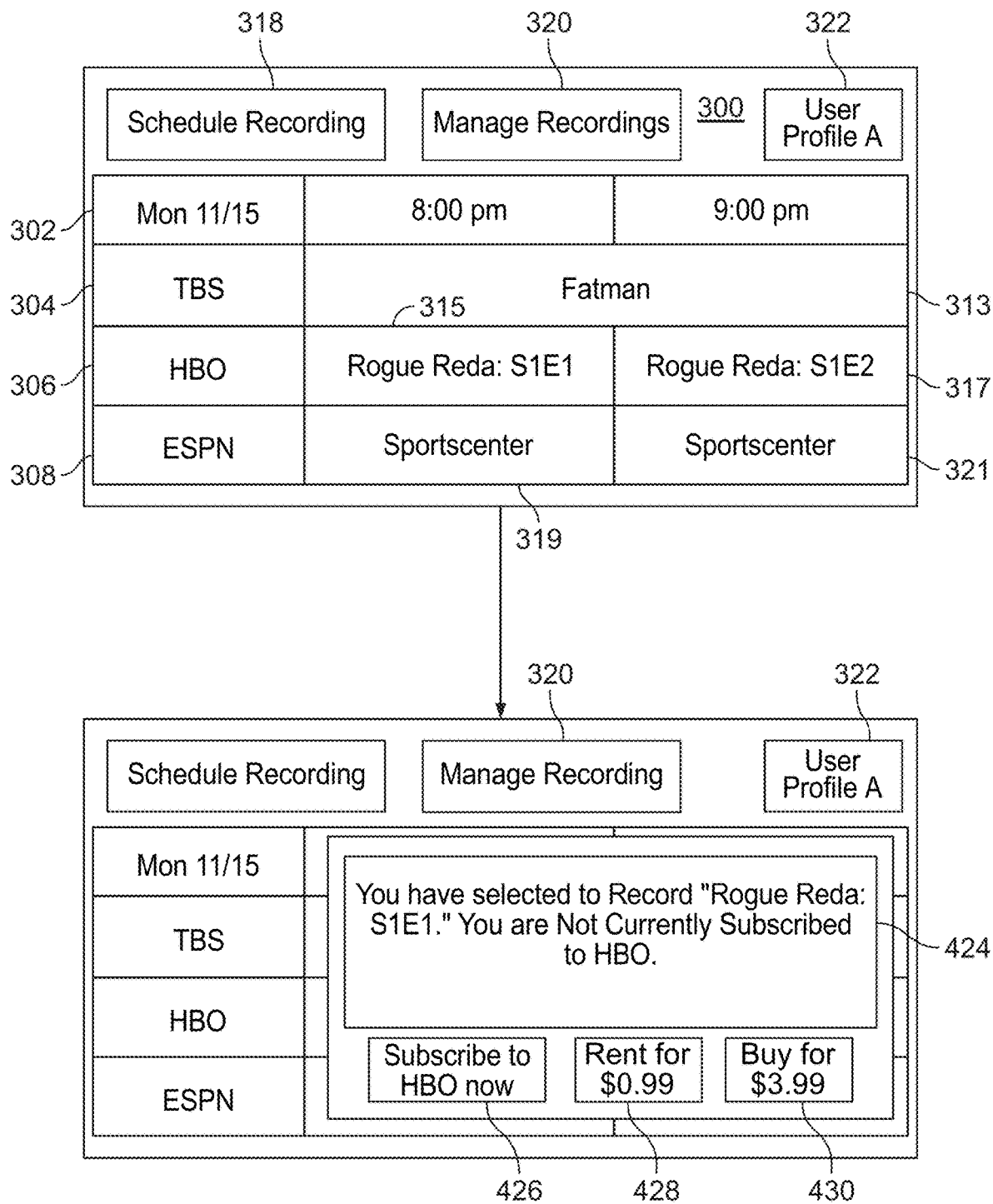
FIG. 4 shows illustrative user interfaces, in accordance with some embodiments of this disclosure.

FIG. 4 shows illustrative user interfaces, in accordance with some embodiments of this disclosure. The storage management application may determine that a request to record the content item associated with content listing 313 ("Rogue Reda: S1E1") has been received from a subscriber associated with the user profile indicated at 323. The storage management application may determine, e.g., using techniques similar to those discussed in connection with FIG. 3, that the subscriber is not entitled to access content listing 313 because the subscriber is not subscribed to content source 306 ("HBO"). For example, the subscriber may have requested access to content listing 313 after having searched for, or been recommended, content listing 313. In response to determining that such request to record content from a channel or content source that the subscriber is not entitled to watch (e.g., not part of his or her subscription), the storage management application may cause notification 424 to be generated for presentation.

Notification 424 may comprise one or more options including an option 430 to allow a subscriber to watch a recorded copy of the content item by charging them a fee, which may be particularly useful if the content is not available on demand (e.g., a newly broadcast episode of a TV series may normally be available on demand after 24 hours, and may still require a subscription to be accessed). In some embodiments, notification 424 may comprise an indication or warning that the subscriber is not subscribed to the content source or channel 306 associated with the recording. In some embodiments, notification 424 may comprise option 426 to enable the subscriber to subscribe to content source 306, in order to then be permitted to schedule the recording, and/or option 428 to rent a recording of the content, and/or option 430 to buy a recording of the content. In some embodiments, if the subscriber elects to buy the recording, then a dedicated copy may recorded for such subscriber and a dedicated untradable or unreclaimable license may be issued to the user profile of the subscriber.

Figure 5:
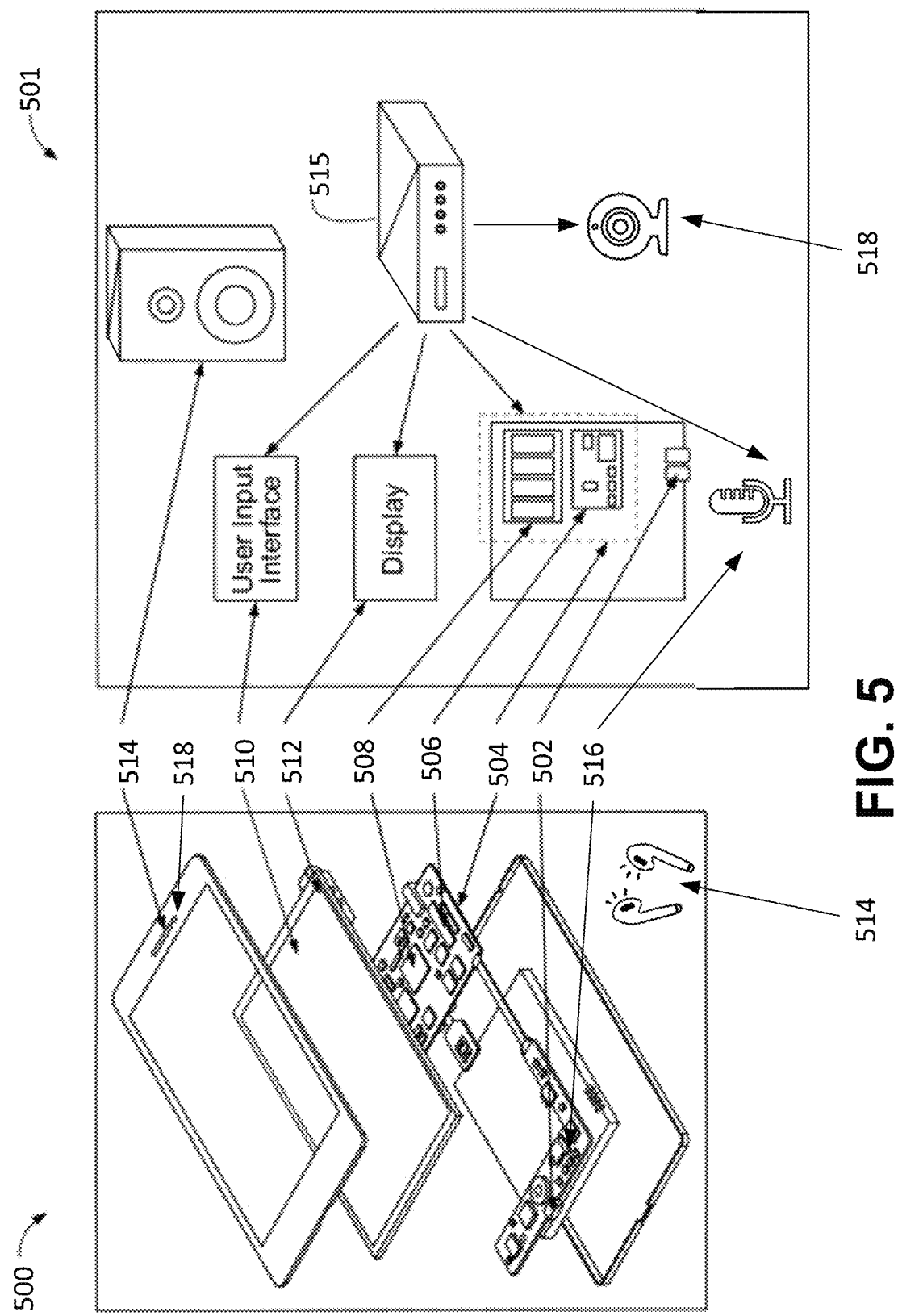
FIG. 5 shows illustrative user equipment devices, in accordance with some embodiments of this disclosure.
Figure 6:
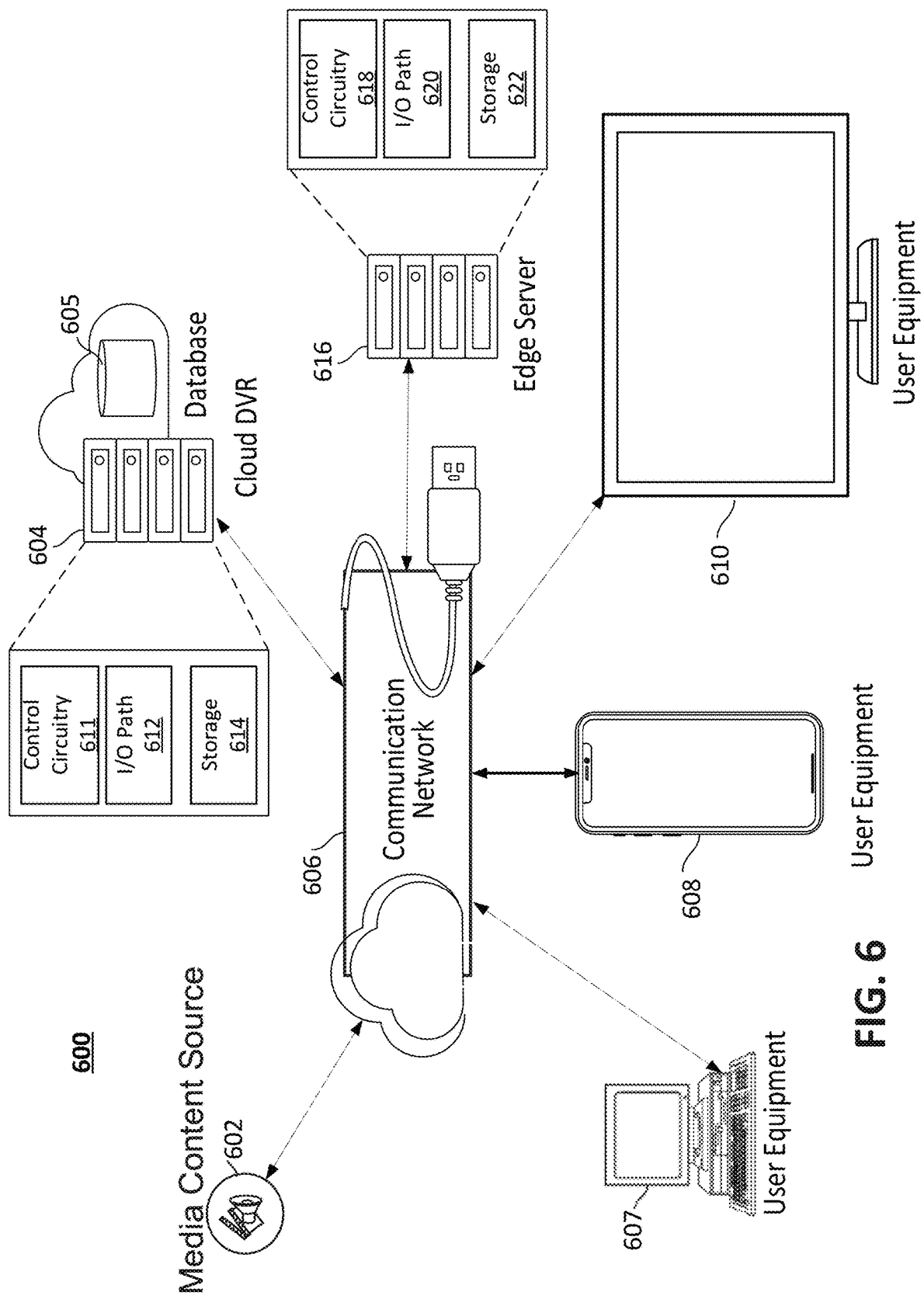
FIG. 6 shows an illustrative system, in accordance with some embodiments of this disclosure.

FIGS. 5-6 describe illustrative devices, systems, servers, and related hardware for minimizing a number of copies of content items stored at a server, in accordance with some embodiments of the present disclosure. FIG. 5 shows generalized embodiments of illustrative user equipment devices 500 and 501, which may correspond to, e.g., consumption devices 108, 110, 112, 114, 116. For example, user equipment device 500 may be a smartphone device, a tablet, a virtual reality or augmented reality device, or any other suitable device capable of accessing content items stored at a server (e.g., cloud DVR 102) over a communication network (e.g. network 606). In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, microphone 516 may receive audio corresponding to a voice commands related to recording content items. In some embodiments, display 512 may be a television display or a computer display. In some embodiments, set-top box 515 may be communicatively connected to user input interface 510. In some embodiments, user input interface 510 may be a remote control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 6. In some embodiments, device 500 may comprise any suitable number of sensors, as well as a GPS module (e.g., in communication with one or more servers and/or cell towers and/or satellites) to ascertain a location of device 500.

Each one of user equipment device 500 and user equipment device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 500), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the storage management application stored in memory (e.g., storage 508). Specifically, control circuitry 504 may be instructed by the storage management application to perform the functions discussed above and below. In some implementations, processing or actions performed by control circuitry 504 may be based on instructions received from the storage management application.

In client/server-based embodiments, control circuitry 504 may include communications circuitry suitable for communicating with a storage management server (e.g., a cloud DVR) or other networks or servers. The storage management application may be a stand-alone application implemented on a device or a server. The storage management application may be implemented as software or a set of executable instructions. The instructions for performing any of the embodiments discussed herein of the storage management application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the storage management application may be a client/server application where only the client application resides on device 500 (e.g., device 104), and a server application resides on an external server (e.g., server 604 and/or server 616). For example, the storage management application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet In a cloud computing environment, various types of computing services for performing searches on the internet or informational databases, providing access to content items, providing storage (e.g., for a database) or parsing data are provided by a collection of network-accessible computing and storage resources (e.g., server 604 and/or edge server 616), referred to as "the cloud." When executed by control circuitry of server 604 or 616, the storage management application may instruct control circuitry 611 or 618 circuitry to perform processing tasks for the client device and facilitate the recording and presentation of content item. The client application may instruct control circuitry 504 to provide content consumption history.

Control circuitry 504 may include communications circuitry suitable for communicating with a cloud DVR, media content source, edge servers and devices, a table or database server, or other networks or servers The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as storage management application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive content item data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The storage management application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide storage management functionality and generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network data, video data, audio data, processing data, content consumption data and user interaction data. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the storage management application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the storage management application may be downloaded and interpreted or otherwise run by an interpreter or virtual machine (run by control circuitry 504). In some embodiments, the storage management application may be encoded in the ETV Binary Interchange Format (EBIF), received by control circuitry 504 as part of a suitable feed, and interpreted by a user agent running on control circuitry 504. For example, the storage management application may be an EBIF application. In some embodiments, the storage management application may be defined by a series of JAVA-based files that are received and run by a local virtual machine or other suitable middleware executed by control circuitry 504. In some of such embodiments (e.g., those employing MPEG-2 or other digital media encoding schemes), storage management application may be, for example, encoded and transmitted in an MPEG-2 object carousel with the MPEG audio and video packets of a program.

FIG. 6 is a diagram of an illustrative system 600 for minimizing a number of copies of content items stored at a server, in accordance with some embodiments of this disclosure. User equipment devices 607, 608, 610 (e.g., which may correspond to one or more of consumption devices 108, 110, 112, 114, 116 of FIG. 1) may be coupled to communication network 606. Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more cloud DVR servers 604 (which may correspond to cloud DVR 102 of FIG. 1), and one or more edge servers 616 (which may correspond to edge servers 104, 106 of FIG. 1). In some embodiments, the storage management application may be executed at one or more of control circuitry 611 of cloud DVR 604 (and/or control circuitry of user equipment devices 607, 608, 610 and/or control circuitry 618 of edge server 616). In some embodiments, data structure 200 of FIG. 2, may be stored at storage 614 or database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide content consumption data, user interaction data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge server 616 may comprise control circuitry 618, I/O path 620 and storage 622, which may be implemented in a similar manner as control circuitry 611, I/O path 612 and storage 624, respectively, of cloud DVR 604. Edge server 616 may be configured to be in communication with one or more of user equipment devices 607, 608, 610 and cloud DVR 604 over communication network 606, and may be configured to provide content from a pool of shared content to subscribers associated with a shared pool of copies of content items. In some embodiments, a plurality of edge servers 616 may be strategically located at various geographic locations, configured to store (e.g., cache) content items for delivery to various shared pools of copies for a plurality of cloud DVR subscribers.

Figure 7:
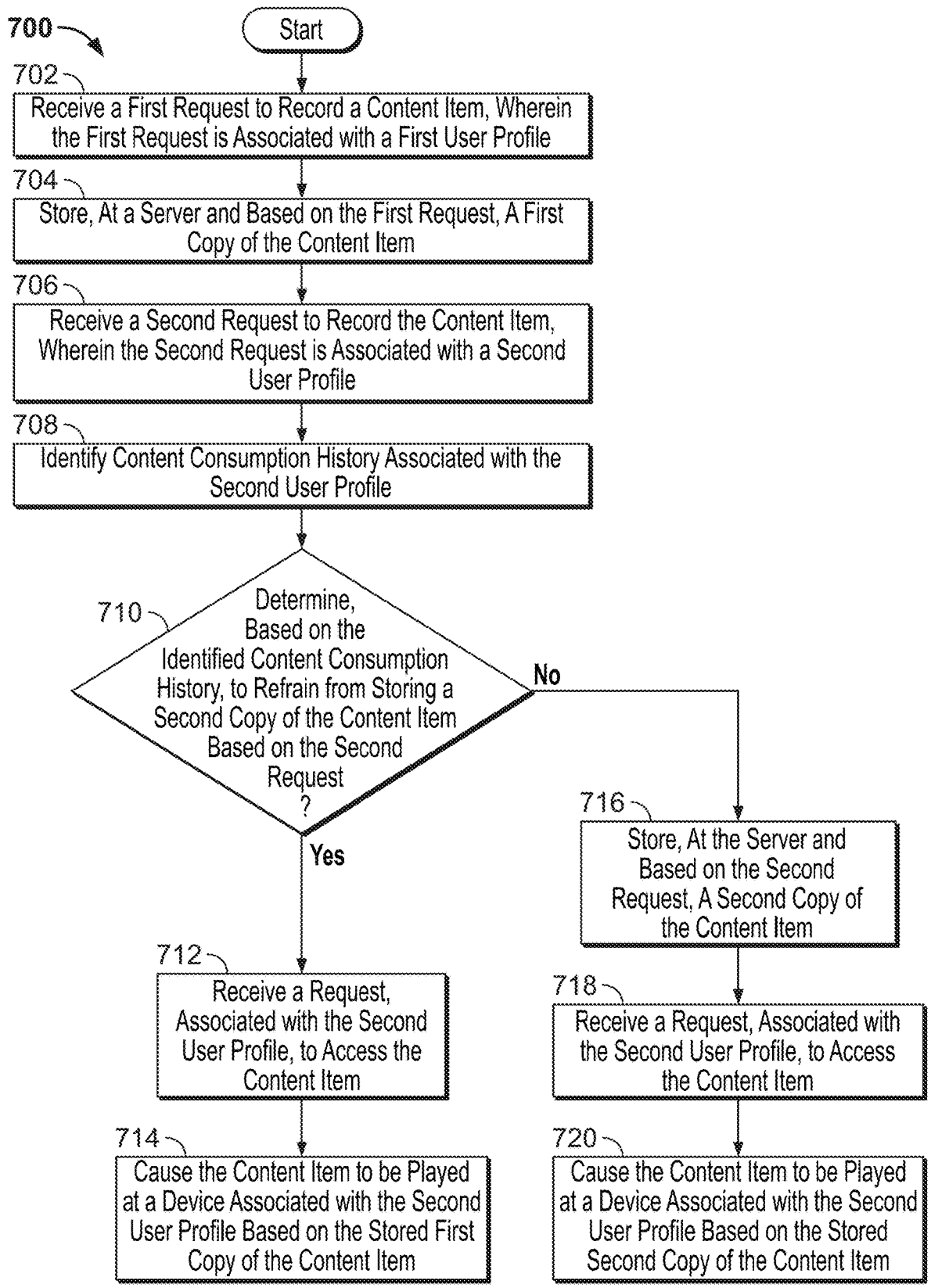
FIG. 7 is a flowchart of a detailed illustrative process for minimizing a number of copies of content items stored at a server, in accordance with some embodiments of this disclosure.

FIG. 7 is a flowchart of a detailed illustrative process for minimizing a number of copies of content items stored at a server, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

At 702, I/O circuitry (e.g., I/O circuitry 612 of cloud DVR 604, which may be included as part of, or may be separate from, control circuitry 611 of cloud DVR 604) may receive a first request to record a content item (e.g., "Fatman" associated with content listing 113 of FIG. 1). Such first request may be received over a communication network (e.g., communication network 606 of FIG. 6) from a consumption device (e.g., consumption device 108 of FIG. 1) at which a subscriber may be logged in using his or her user profile (e.g., as indicated at 123 of FIG. 1) with the cloud DVR service.

At 704, control circuitry 611 of cloud DVR 604 may store (e.g., at storage 614 and/or database 605 of FIG. 6), based on the first request received at 702, a first copy of the content item (e.g., "Fatman" associated with content listing 113 of FIG. 1). For example, control circuitry 611 may schedule a recording to occur when the content item is broadcasted, and store a copy of the content item once it is recorded after or during such broadcast.

At 706, I/O circuitry 612 of cloud DVR 604 may receive a second request to record the content item (e.g., "Fatman" associated with content listing 113 of FIG. 1). Such second request may be received over a communication network (e.g., communication network 606 of FIG. 6) from a consumption device (e.g., consumption device 110 of FIG. 1) at which a subscriber may be logged in using his or her user profile (e.g., user prolife B of FIG. 1) with the cloud DVR service.

At 708, control circuitry 611 of cloud DVR 604 may identify content consumption history associated with the second user profile. For example, control circuitry 611 may access data structure 200 of FIG. 2 and analyze various user-specific interaction data with respect to previous recordings scheduled by the second user profile (e.g., how promptly the second user profile consumes a recording, a weight of other recorded content item in terms of an order or sequence of likely consumption of recordings, etc.) and/or analyze various content-specific data (e.g., popularity data) of the content item requested to be recorded (e.g., "Fatman").

At 710, control circuitry 611 may determine, based on such identified content consumption history, whether to refrain from storing a second copy of the content item based on the second request. For example, control circuitry 611 may determine whether it is likely that the copy of the content item (stored at 704) is likely to be available when the second user profile requests to consume the recorded content, in which case it may not be necessary to store a copy of the content item based on the second request. In response to determining to refrain from storing a second copy of the content item, processing may proceed to 712. In response to determining that a second copy of the content item should be stored (e.g., not to refrain from storing the second copy of the content item), processing may proceed to 716. For example, processing may proceed to 716 if control circuitry 611 determines that it is likely that each of the first and second user profiles might request access to the same copy of the content item while another of the user profiles is consuming such copy.

Figure 10:
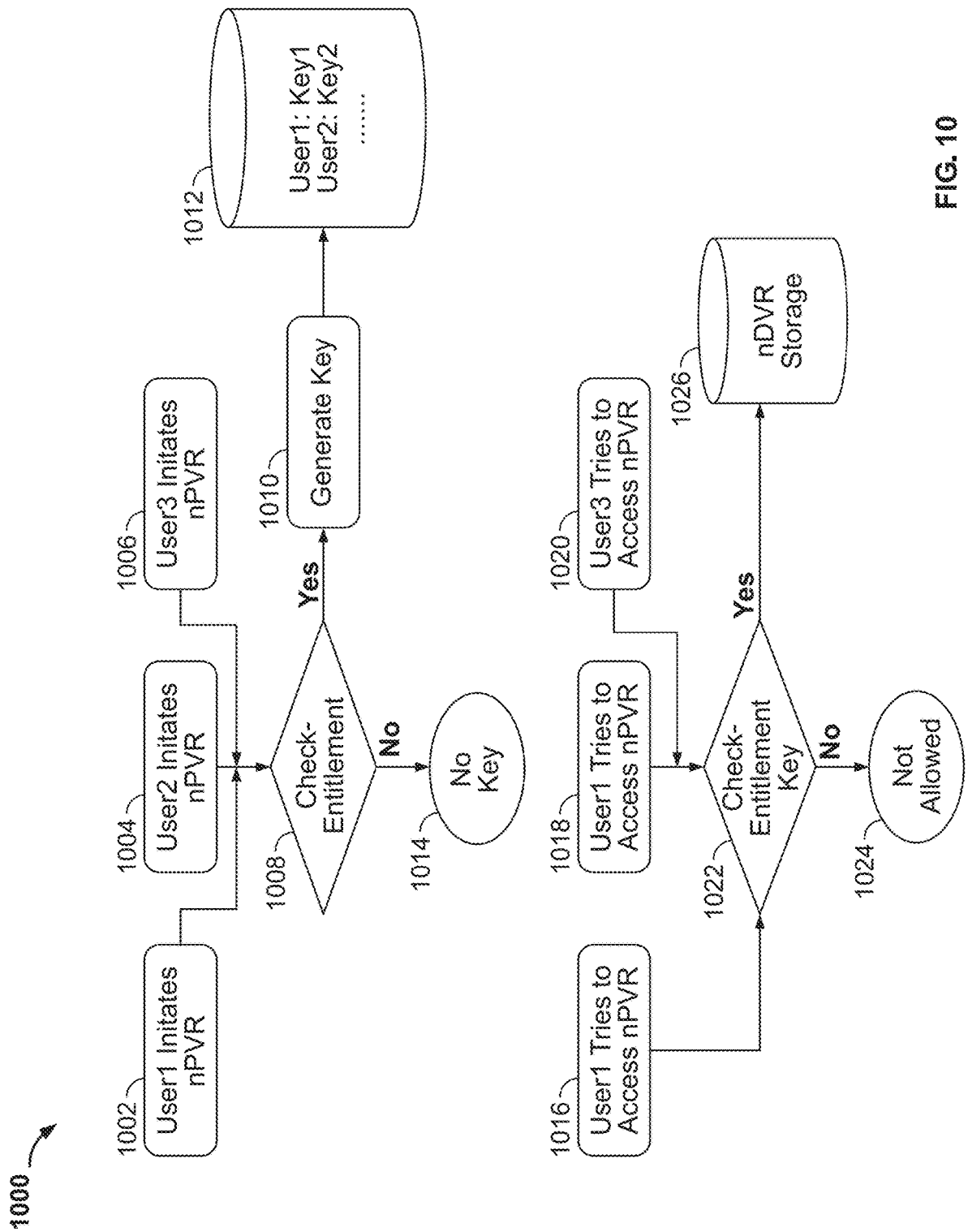
FIG. 10 is a flowchart of a detailed illustrative process for minimizing a number of copies of content items stored at a server, in accordance with some embodiments of this disclosure.

At 712, I/O circuitry 612 of cloud DVR 604 may receive a request, associated with the second user profile (e.g., user profile B associated with consumption device 110 of FIG. 10), to access the content item previously requested to be recorded at 706. At 714, control circuitry 611 of cloud DVR 604 may cause the requested content item (e.g., "Fatman" associated with content listing 113) to be played at the consumption device (e.g., consumption device 110) associated with the second user profile based on the stored first copy of the content item (e.g., stored at 704, based on the request received from the first user profile, e.g., indicated at 123 and associated with consumption device 108).

At 716, in response to determining, at 710, that a second copy of the content item should be stored (e.g., not to refrain from storing the second copy of the content item), control circuitry 611 may store a second copy of the content item (e.g., at storage 614 and/or database 605 of FIG. 6). At 718, I/O circuitry 612 of cloud DVR 604 may receive a request, associated with the second user profile (e.g., user profile B associated with consumption device 110 of FIG. 1), to access the content item previously requested to be recorded at 706. At 720, control circuitry 611 of cloud DVR 604 may cause the requested content item (e.g., "Fatman" associated with content listing 113) to be played at the consumption device (e.g., consumption device 110) associated with the second user profile based on the stored second copy of the content item (e.g., stored at 716).

Figure 8:
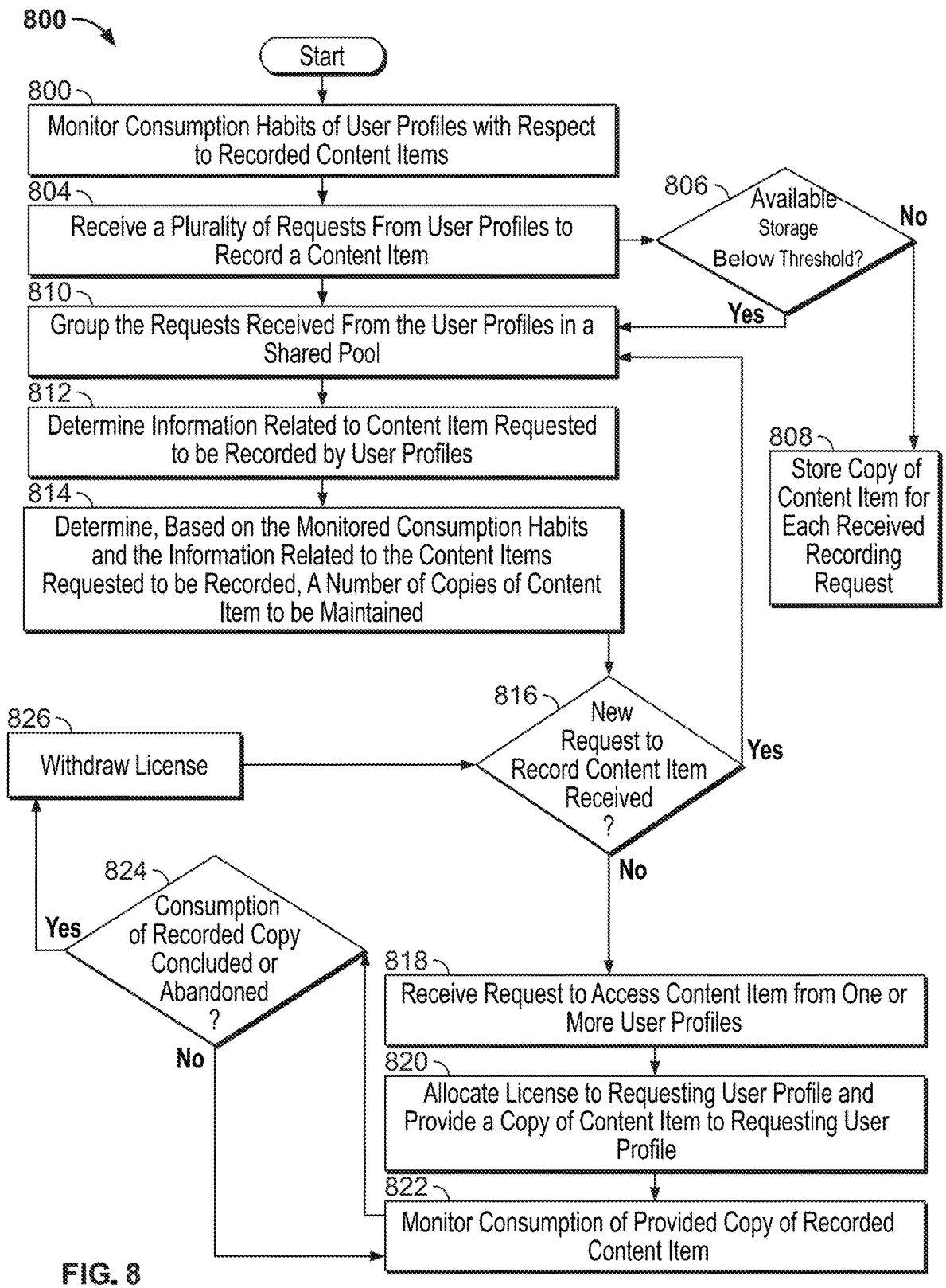
FIG. 8 is a flowchart of a detailed illustrative process for minimizing a number of copies of content items stored at a server, in accordance with some embodiments of this disclosure.

FIG. 8 is a flowchart of a detailed illustrative process for minimizing a number of copies of content items stored at a server, in accordance with some embodiments of this disclosure. In various embodiments, the individual steps of process 800 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead.

At 802, control circuitry 611 of cloud DVR 604 may monitor consumption habits of user profiles with respect to recorded content items. For example, control circuitry 611 may collect information regarding how each user profile interacts with recorded content, and store such information at, e.g., storage 614 or database 605, such as, for example, data structure 200. As an example, cloud DVR 604 (e.g., comprising a plurality of servers and/or edge servers) may have three million subscribers, across any suitable number of regions (e.g., 10 states and multiple counties) in any suitable jurisdiction (e.g., the United States).

At 804, I/O circuitry (e.g., I/O circuitry 612 of cloud DVR 604) may receive a plurality of requests from user profiles to record a content item. As an example, I/O circuitry 612 may receive recording requests from 100,000 of three million subscribers to record a content item (e.g., "Fatman" associated with content listing 113 of FIG. 1) ahead of its first airing on a particular content source (e.g., TBS) at 8:00 PM EST on a particular day.

At 806, control circuitry 611 may determine, while receiving such requests at 802, whether an available amount of storage capacity (e.g., of storage 614 and/or database 605) of cloud DVR 604 is below or a predefined threshold. For example, if the threshold is set at 20% available capacity, and control circuitry 611 determines that only 10% of storage capacity is available, processing may proceed to 810. On the other hand, if the threshold is set at 20% available capacity, and control circuitry 611 determines that 40% of storage capacity is available, processing may proceed to 808, where control circuitry 611 may store a copy of the requested content item each time a recording request is received, e.g., when the content item is broadcasted, such storage may occur.

At 810, control circuitry 611 may group the requests received from the user profiles at 802 in a shared pool. In some embodiments, for each received request, control circuitry 611 may assign the user profile associated with the request into a particular shared pool based on a particular edge server that typically serves requests for recorded content to consumption devices associated with respective user profiles. For example, control circuitry 611 may reference column 226 of data structure 200 to identify the appropriate edge server for each user profile.

At 812, control circuitry 611 may determine information related to the content item (e.g., "Fatman" associated with content listing 113) requested to be recorded by the user profiles. For example, control circuitry 611 may determine a popularity of the content item, which may be indicative of the likelihood that certain user profiles may request to consume the recorded content item and/or the likelihood of receiving additional requests to record the content item.

At 814, control circuitry 611 may determine, based on the monitored consumption habits (at 802) and the information related to the content items requested to be recorded (determined at 814), a number of copies of content item to be maintained. For example, control circuitry 611 may utilize any suitable combination of heuristic-based and/or machine learning techniques to predict a minimum number of recorded copies of the content item, e.g., sufficient to satisfy predicted or anticipated requests to access the content item received by subscribers in the shared pool at any given time. Control circuitry 611 may analyze data for individual user profiles (e.g., user profile 202 indicated at data structure 200, the user profile indicated at 204 indicated at data structure, etc.) and/or a collective user profile (e.g., indicated at 208) to determine such minimum number of copies.

At 816, I/O circuitry 612 may determine whether a new request to record the content item (e.g., "Fatman" associated with content listing 113 of FIG. 1) has been received. If such request is received, control circuitry 611 may return to 810 in order to associate the request with a particular subscriber pool. In some embodiments, a content item may be associated with a plurality of shared subscriber pools, e.g., where subscribers may be assigned to a particular subscriber pool based on any suitable combination of factors (e.g., similar viewing habits, similar locations, served by similar edge servers, etc.). If such request is not being received, processing may proceed to 818.

At 818, I/O circuitry 612 may receive a request to access the content item (e.g., "Fatman" associated with content listing 113) from one or more user profiles. At 820, control circuitry 611 may allocate a license to such requesting user profile (e.g., user profile indicated at 123) associated with the shared pool of subscribers and provide a copy of the content item to such requesting user profile. For example, each copy of the content item may be associated with an allocable license, which may be retrieved from a licensing server and may be used to access the provided copy of the content item. For example, no other user profile may be permitted to access the provided copy of the content item while the user profile indicated at 123 of FIG. 1 is accessing the provided copy of the content item using the allocated license.

At 822, control circuitry 611 may monitor consumption of the provided copy of the recorded content item. Based on such monitoring, control circuitry 611 may determine, at 824, whether consumption of the content has concluded or has been abandoned. For example, control circuitry 611 may retrieve, e.g., from the consumption device at which the subscriber is consuming content, an amount of time the content item has been consumed and compare the amount of time the user profile spent consuming the content item to the total runtime of the content item, e.g., indicated by metadata of the content item indicated in association with EPG data. If the total runtime of the content item exceeds a threshold (e.g., 90% of total runtime), control circuitry 611 may determine that consumption of the content item has concluded. As another example, control circuitry 611 may determine whether the user profile has abandoned the viewing session based on, e.g., if the user profile tunes to a different channel, requests to watch a different recording, launches a different app on their device (e.g., STB), accepts a phone call (e.g., when viewing the recorded content on their mobile device and/or via a mobile app), etc.

At 826, control circuitry 611 in response to determining that the user profile has abandoned or concluded consumption of the copy of the content item, control circuitry 611 may withdraw the allocated license as well as the entitlement of the user profile to access the particular provided copy of the content item. Thus, the license and associated copy of the content item may be available to be provided to another user requesting (e.g., at 818) to view the recorded copy of the content item. Alternatively, control circuitry 611 may determine that such copy of the content item, and/or the license associated with the content item, may be deleted, based on the monitored consumption history of the subscribers associated with the shared pool and/or content-specific information (e.g., popularity) fluctuations.

Figure 9:
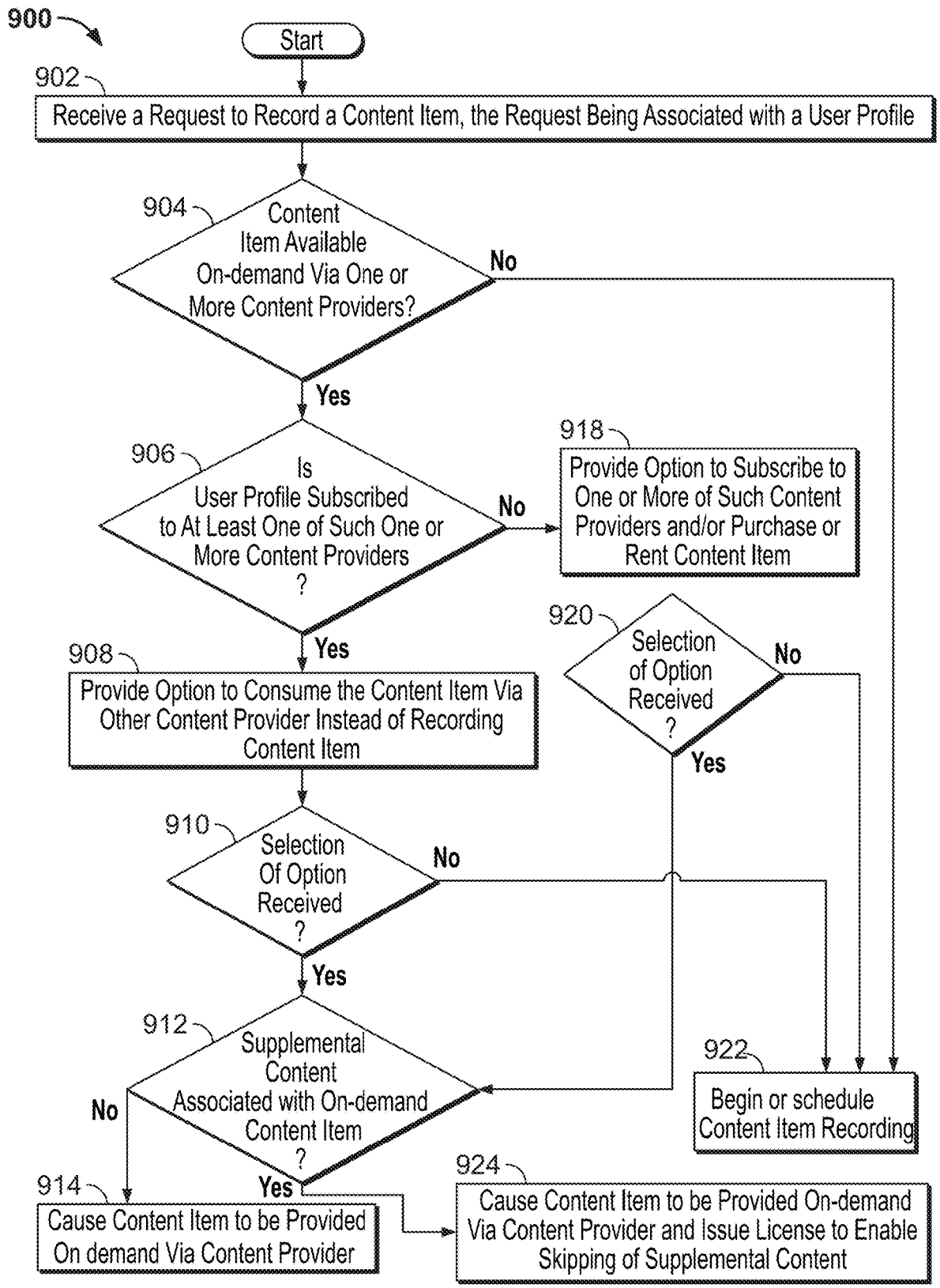
FIG. 9 is a flowchart of a detailed illustrative process for minimizing a number of copies of content items stored at a server, in accordance with some embodiments of this disclosure.

FIG. 9 is a flowchart of a detailed illustrative process 900 for minimizing a number of copies of content items stored at a server, in accordance with some embodiments of this disclosure. In various embodiments, the individual steps of process 900 may be implemented by one or more components of the devices and systems of FIGS. 1-6. Although the present disclosure may describe certain steps of process 900 (and of other processes described herein) as being implemented by certain components of the devices and systems of FIGS. 1-6, this is for purposes of illustration only, and it should be understood that other components of the devices and systems of FIGS. 1-6 may implement those steps instead.

At 902, I/O circuitry (e.g., I/O circuitry 612 of cloud DVR 604) may receive a request to record a content item (e.g., "Fatman" associated with content listing 113 of FIG. 1). Such first request may be received over a communication network (e.g., communication network 606 of FIG. 6) from a consumption device (e.g., consumption device 108 of FIG. 1) at which a subscriber may be logged in with his or her user profile (e.g., as indicated at 123 of FIG. 1) with the cloud DVR service.

At 904, control circuitry 611 of cloud DVR 604 may determine whether the content item associated with the request received at 902 is available, e.g., on demand via one or more content providers. For example, cloud DVR 604 may additionally provide a service enabling subscribers to access content items on demand, and/or cloud DVR 604 may determine whether other content services (e.g., Netflix, Hulu, HBO Max) currently are providing access to the content item on demand. If control circuitry 611 determines that the content item is available on demand from at least one content source, processing may proceed to 906. Otherwise processing may proceed to 922, where control circuitry 611 of cloud DVR 604 may schedule the recording of the content item by way of the cloud DVR 604 service.

At 906, control circuitry 611 may determine whether a subscriber associated with the user profile (e.g., as indicated at 123 of FIG. 1) is permitted to access on-demand content, e.g., associated with an operator of cloud DVR 604, and/or associated with another content provider. For example, control circuitry 611 may query, e.g., via an API, other applications or servers associated with the content providers, and/or check whether the subscriber is logged in to one or more such content providers, on the consumption device he or she is currently using. Processing may proceed to 908 if control circuitry 611 determines the user can access the requested content item on demand; otherwise processing may proceed to 918.

At 908, control circuitry 611 may provide an option (e.g., option 326 included as part of notification 324 of FIG. 3) to consume the content item via another content provider instead of recording the content item. For example, control circuitry 611 may deep link option 326 to HBO Max, to enable the user to directly access the content item "Fatman" by selecting affirmative option 326 of FIG. 3.

At 910, control circuitry 611 may determine whether selection of the option (e.g., option 326) is received. Upon determining that selection of option 328 is received, control circuitry 611 may cause the content item to begin being recorded or to be scheduled for recording (at 922). On the other hand, upon determining that selection of option 326 is received, control circuitry 611, processing may proceed to 912.

At 912, control circuitry 611 may determine whether the on-demand content, available via the on-demand content provider (e.g., associated with notification 324), is associated with supplemental content. For example, control circuitry 611 may query such on-demand content provider, and/or analyze metadata associated with the on-demand content or on-demand content provider to determine whether one or more advertisements are scheduled to interrupt the presentation of the on-demand content when the user consumes such content. In response to determining supplemental content is not associated with the on-demand content, processing may proceed to 914; otherwise, processing may proceed to 924.

At 914, control circuitry 611 may re-direct the user to the on-demand content provider indicated at notification 324, to permit the user to consume such content on-demand at the content provider. Accordingly, storage of another copy of a recorded content item may be avoided and/or the minimum number of copies of the content to be maintained may decrease, thereby avoiding unnecessary expenditure of computing resources of the cloud DVR provider, and such technique may be utilized with any suitable number of recording requests, to potentially preserve a significant amount of computing resources of the cloud DVR provider.

At 924, control circuitry 611 may, having determined that the on-demand content is associated with supplemental content, may re-direct the user to the on-demand content provider indicated at notification 324, to permit the user to consume such content on demand at the content provider. In addition, at 924, control circuitry 611 may issue a license to the user, which may be used by the user to skip supplemental content (e.g., advertisements) that would otherwise interrupt the viewing experience of the user. Accordingly, storage of another copy of a recorded content item may be avoided and/or the minimum number of copies of the content to be maintained may decrease, while at the same time enabling the user to skip advertisements (which may have been the reason the user desired to record the content in the first place).

At 918, control circuitry 611, after determining that the subscriber associated with the user profile having requested to record the content item is not entitled to access (e.g., does not have a subscription with) a content source that provides such content item on-demand, may provide an option (e.g., one or more of options 426, 428, 430) to subscribe to one or more of such content providers and/or purchase or rent the content item. At 920, control circuitry 611 determines whether selection of one of such options has been received, and, if so, processing may proceed to 912; otherwise processing may proceed to 922, where control circuitry 611 may begin recording or schedule the recording of the content item. In some embodiments, prior to scheduling the recording, one or more of the techniques of FIGS. 7-8 may be employed to determine whether a copy of the content item should be recorded.

FIG. 10 is a flowchart of a detailed illustrative process 1000 for minimizing a number of copies of content items stored at a server, in accordance with some embodiments of this disclosure. In various embodiments, the individual steps of process 1000 may be implemented by one or more components of the devices and systems of FIGS. 1-6. Although the present disclosure may describe certain steps of process 1000 (and of other processes described herein) as being implemented by certain components of the devices and systems of FIGS. 1-6, this is for purposes of illustration only, and it should be understood that other components of the devices and systems of FIGS. 1-6 may implement those steps instead.

Based on requests received at 1002, 1004 and 1006, control circuitry 611 of cloud DVR 604 may determine that a plurality of user profiles have requested to initiate a process to record a content item via cloud DVR 604. Based on the request received at 1002, a copy of the content may be recorded and created for storage in a remote cloud environment, and the user's entitlement to access the content (e.g., a digital rights management key) may be stored locally and/or in the cloud.

Based on the request received at 1004, when a second user makes a request for recording the same content, control circuitry 611 may determine whether the previously recorded copy was of higher quality (e.g., higher resolution) or lower quality (e.g., lower resolution) as compared to the copy being requested to be recorded. If the previously recorded copy was of lower quality, a new copy may be recorded and stored. In some embodiments, a defined number of copies, each associated with different quality and encoding standards, may be created, and control circuitry 611 may conservatively create copies for different quality and formats based on the received recording requests. In some embodiments, if control circuitry 611 determines that the stored copy is of the same quality as a quality of the copy requested to be recorded by the second user, control circuitry 611 may decline to store an additional copy, and may instead provide an entitlement (e.g., DRM key) to the second user to access the previously stored copy associated with the first request. In some embodiments, a virtual copy of the content may be created and mapped to particular user profiles. In other words, a reference to the previously recorded content item may be associated, e.g., with the second user's profile.

In some embodiments, cloud DVR 604 may provide nDVR functionalities as third party services, where users of different service providers can initiate request for recording and consuming the content. In some embodiments, if a user requests to consume the content, a cache copy of the content may be created on content delivery network servers and nodes. In some embodiments, whenever a user requests for nPVR recording, a key may be generated for each user who has entitlement, and using such key each user may access the recording and consume the content. In some embodiments, limiting access to the content to entitled users may preserve storage space of cloud DVR 604. In some embodiments, the key may be associated with a predefined amount of time, e.g., an operator of cloud DVR 604 may specify a duration of time during which the user can access the content. In some embodiments, such copy may be automatically deleted after consumption by the user, e.g., using a smart contract, such as, for example, if the copy of the content or a reference to such copy is stored on a distributed ledger.

At 1008, if a content item is requited to be recorded based on 1002, control circuitry 611 may determine whether the user profile requesting such recording is entitled to record content via cloud DVR 604, and if so, processing may proceed to 1010 to generate a key (key1) for storage at database 1012 (which may correspond to database 605 of FIG. 6) and, if so, begin recording the content item. If the same content is requested to be recorded based on the request received at 1004, control circuitry 611 may generate another key (key2) upon determining that the second user is entitled to record the content item, but may not initiate the recording since the same content is already recorded or scheduled to be recorded or currently being recorded based on the request associated with the first user at 1002. On the other hand, if a third request associated with a third user at 1006 is received, control circuitry 611 may determine such user is not entitled to record the content item, and thus at 1014 may decline to generate a key for the third user.

At 1022, control circuitry 611 may, each time a request 1016, 1018, 1020 is received to access a copy of the recorded content item, determine whether the requesting user is associated with an entitlement key. If so, a copy of the content may be retrieved from database 1026 (which may correspond to database 605 of FIG. 6) and provided to the user for consumption. On the other hand, if a requesting user is not associated with an entitlement key, processing may proceed to 1024, where such user is not permitted to access the recorded copy.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
receiving a plurality of requests to record a content item, wherein the plurality of requests are respectively associated with a plurality of user profiles and the plurality of user profiles are respectively associated with content consumption histories;
determining, based on the content consumption histories respectively associated with the plurality of user profiles, a plurality of future times that users of the plurality of user profiles are likely to request to access the content item;
generating a shared pool of copies of the content item for the plurality of user profiles by storing, at a server and based on the plurality of requests, a plurality of copies of the content item, wherein a number of the plurality of copies of the content item in the shared pool is a minimum number of copies of the content item determined, based on the plurality of future times, to be sufficient to fulfill requests received from the users of the shared pool to access respective copies of the plurality of copies of the content item in the shared pool at a given time, and the number of the plurality of copies in the shared pool is less than a number of the plurality of requests;
receiving a particular request to record the content item, wherein the particular request is associated with a particular user profile;
determining, based on a content consumption history of the particular user profile, a particular future time at which a user of the particular user profile is likely to request to access the content item;
determining whether to store an additional copy of the content item in the shared pool based on the particular request by comparing the particular future time to the plurality of future times;
based at least in part on determining to store the additional copy of the content item in the shared pool, updating the shared pool to include the additional copy of the content item;
receiving a request, associated with the particular user profile, to access the content item; and
based at least in part on receiving the request and determining to store the additional copy, causing the content item to be played at a device associated with the particular user profile using one of the plurality of copies of the content item included in the updated shared pool.

2. The method of claim 1, wherein causing the content item to be played at the device associated with the particular user profile using one of the plurality of copies of the content item included in the updated shared pool comprises causing the content item to be played using the additional copy.

3. The method of claim 1, wherein determining the minimum number of copies of the content item comprises:
inputting, to a trained machine learning model, data indicative of the content consumption histories respectively associated with the plurality of user profiles associated with the shared pool; and receiving, as output from the trained machine learning model, data indicative of the minimum number of copies.

4. The method of claim 3, further comprising:
obtaining the trained machine learning model by training a machine learning model using historical data comprising a number of requests to record a particular content item, content consumption histories of the users associated with the number of requests, and a maximum number of users having requested to access the particular content item at one or more given times.

5. The method of claim 1, wherein the determining whether to store the additional copy of the content item in the shared pool based on the particular request by comparing the particular future time to the plurality of future times further comprises:
based at least in part on determining that the particular future time is different than each of the plurality of future times, refraining from storing the additional copy of the content item in the shared pool.

6. The method of claim 1, wherein the determining whether to store the additional copy of the content item in the shared pool based on the particular request by comparing the particular future time to the plurality of future times further comprises:
based at least in part on determining that the particular future time is included in the plurality of future times, storing the additional copy of the content item in the shared pool.

7. The method of claim 1, further comprising:
determining a popularity of the content item;
determining, based on the content consumption histories respectively associated with the plurality of user profiles, weights of other content items scheduled for recording for the plurality of user profiles associated with the shared pool, wherein the weights represent a likelihood of an order of consumption of content; and
each time a new request to record the content item is received in association with a user profile of the plurality of user profiles associated with the shared pool, determining whether to update the number of the plurality of copies of the content item in the shared pool based on at least one of the determined weights of the other content items scheduled for recording or the popularity of the content item.

8. The method of claim 1, further comprising:
associating the plurality of user profiles with the shared pool based on determining that each other plurality of user profiles is frequently provided recorded content via a common edge server.

9. The method of claim 1, further comprising:
based at least in part on receiving the particular request, determining whether available storage of the server is below a threshold; and
based at least in part on determining that the available storage of the server is below the threshold, performing the determination of whether to store the additional copy of the content item.

10. The method of claim 1, further comprising:
receiving an additional request to record the content item, wherein the additional request is associated with an additional user profile;
determining that the additional user profile is associated with a subscription to a content service that provides access to the content item on-demand;
determining to refrain from storing a copy of the content item based on the additional request; and
based at least in part on receiving a request, associated with the additional user profile, to access the content item, causing the content item to be played at a device associated with the additional user profile via the content service.

11. A system comprising:
a server; and
control circuitry configured to:
receive a plurality of requests to record a content item, wherein the plurality of requests are respectively associated with a plurality of user profiles and the plurality of user profiles are respectively associated with content consumption histories;
determine, based on the content consumption histories respectively associated with the plurality of user profiles, a plurality of future times that users of the plurality of user profiles are likely to request to access the content item;
generate a shared pool of copies of the content item for the plurality of user profiles by storing, at the server and based on the plurality of requests, a plurality of copies of the content item, wherein a number of the plurality of copies of the content item in the shared pool is a minimum number of copies of the content item determined, based on the plurality of future times, to be sufficient to fulfill requests received from the users of the shared pool to access respective copies of the plurality of copies of the content item in the shared pool at a given time, and the number of the plurality of copies in the shared pool is less than a number of the plurality of requests;
receive a particular request to record the content item, wherein the particular request is associated with a particular user profile;
determine, based on a content consumption history of the particular user profile, a particular future time at which a user of the particular user profile is likely to request to access the content item;
determine whether to store an additional copy of the content item in the shared pool based on the particular request by comparing the particular future time to the plurality of future times;
based at least in part on determining to store the additional copy of the content item in the shared pool, update the shared pool to include the additional copy of the content item;
receive a request, associated with the particular user profile, to access the content item; and
based at least in part on receiving the request and determining to store the additional copy, cause the content item to be played at a device associated with the particular user profile using one of the plurality of copies of the content item included in the updated shared pool.

12. The system of claim 11, wherein the control circuitry is further configured to cause the content item to be played at the device associated with the particular user profile using one of the plurality of copies of the content item included in the updated shared pool by causing the content item to be played using the additional copy.

13. The system of claim 11, wherein the control circuitry is further configured to determine the minimum number of copies of the content item by:
inputting, to a trained machine learning model, data indicative of the content consumption histories respectively associated with the plurality of user profiles associated with the shared pool; and receiving, as output from the trained machine learning model, data indicative of the minimum number of copies.

14. The system of claim 13, wherein the control circuitry is further configured to:
obtain the trained machine learning model by training a machine learning model using historical data comprising a number of requests to record a particular content item, content consumption histories of the users associated with the number of requests, and a maximum number of users having requested to access the particular content item at one or more given times.

15. The system of claim 11, wherein the control circuitry is further configured to determine whether to store the additional copy of the content item in the shared pool based on the particular request by comparing the particular future time to the plurality of future times by:
based at least in part on determining that the particular future time is different than each of the plurality of future times, refraining from storing the additional copy of the content item in the shared pool.

16. The system of claim 11, wherein the control circuitry is further configured to determine whether to store the additional copy of the content item in the shared pool based on the particular request by comparing the particular future time to the plurality of future times by:
based at least in part on determining that the particular future time is included in the plurality of future times, storing the additional copy of the content item in the shared pool.

17. The system of claim 11, wherein the control circuitry is further configured to:
determine a popularity of the content item;
determine, based on the content consumption histories respectively associated with the plurality of user profiles, weights of other content items scheduled for recording for the plurality of user profiles associated with the shared pool, wherein the weights represent a likelihood of an order of consumption of content; and
each time a new request to record the content item is received in association with a user profile of the plurality of user profiles associated with the shared pool, determine whether to update the number of the plurality of copies of the content item in the shared pool based on at least one of the determined weights of the other content items scheduled for recording or the popularity of the content item.

18. The system of claim 11, wherein the control circuitry is further configured to:
associate the plurality of user profiles with the shared pool based on determining that each other plurality of user profiles is frequently provided recorded content via a common edge server.

19. The system of claim 11, wherein the control circuitry is further configured to:
based at least in part on receiving the particular request, determine whether available storage of the server is below a threshold; and
based at least in part on determining that the available storage of the server is below the threshold, perform the determination of whether to store the additional copy of the content item.

20. The system of claim 11, wherein the control circuitry is further configured to:
receive an additional request to record the content item, wherein the additional request is associated with an additional user profile;
determine that the additional user profile is associated with a subscription to a content service that provides access to the content item on-demand;
determine to refrain from storing a copy of the content item based on the additional request; and
based at least in part on receiving a request, associated with the additional user profile, to access the content item, cause the content item to be played at a device associated with the additional user profile via the content service.

* * * * *